US012795676B2

(12) United States Patent
Sakhnini et al.

(10) Patent No.: US 12,795,676 B2
(45) Date of Patent: Nov. 10, 2026

(54) CONFIGURATION FOR MULTIPLE PDSCH/PUSCH WITH DIFFERENT PARAMETERS USING DCI

(71) Applicant: QUALCOMM Incorporated, San Diego, CA (US)

(72) Inventors: Iyab Issam Sakhnini, San Diego, CA (US); Tao Luo, San Diego, CA (US); Mahmoud Taherzadeh Boroujeni, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1043 days.

(21) Appl. No.: 17/819,448

(22) Filed: Aug. 12, 2022

(65) Prior Publication Data

US 2024/0057093 A1 Feb. 15, 2024

(51) Int. Cl.

| | |
|---|---|
| ***H04W 72/51*** | (2023.01) |
| ***H04L 5/00*** | (2006.01) |
| ***H04W 72/23*** | (2023.01) |
| ***H04W 72/232*** | (2023.01) |

(52) U.S. Cl.

CPC ............... *H04W 72/23* (2023.01); *H04L 5/00* (2013.01); *H04W 72/232* (2023.01); *H04W 72/51* (2023.01)

(58) Field of Classification Search

CPC ... H04W 72/23; H04W 72/51; H04W 72/232; H04L 5/00

See application file for complete search history.

(56) References Cited

U.S. PATENT DOCUMENTS

| | | | | |
|---|---|---|---|---|
| 11,638,282 | B2 * | 4/2023 | Bae | H04L 1/0072 370/336 |
| 2013/0195041 | A1 * | 8/2013 | Papasakellariou | H04L 1/1671 370/329 |
| 2013/0272259 | A1 * | 10/2013 | Kim | H04L 5/003 370/329 |
| 2019/0149365 | A1 * | 5/2019 | Chatterjee | H04W 76/11 370/329 |
| 2021/0092759 | A1 * | 3/2021 | Xiong | H04W 72/0446 |
| 2021/0160879 | A1 * | 5/2021 | Lin | H04W 72/0453 |
| 2022/0174610 | A1 * | 6/2022 | Qiao | H04W 52/283 |
| 2022/0346091 | A1 * | 10/2022 | Karmoose | H04L 1/0072 |
| 2023/0156704 | A1 * | 5/2023 | Wang | H04L 1/1861 370/329 |
| 2023/0199730 | A1 * | 6/2023 | Rudolf | H04L 1/0025 370/329 |
| 2024/0063879 | A1 * | 2/2024 | Zhou | H04B 7/063 |
| 2024/0236990 | A1 * | 7/2024 | Li | H04W 72/232 |
| 2024/0323952 | A1 * | 9/2024 | Shimezawa | H04W 72/232 |

(Continued)

*Primary Examiner* — Tonia L Dollinger

(74) *Attorney, Agent, or Firm* — PROCOPIO, CORY, HARGREAVES & SAVITCH LLP

(57) ABSTRACT

A method of wireless communication a UE is disclosed herein. The method includes receiving a single DCI scheduling resources for a plurality of physical shared channel transmissions and indicating one or more parameters of each of the plurality of physical shared channel transmissions based on at least one of an entry in a table, a pattern, a linkage parameter, or a rule. The method further includes transmitting or receiving data over at least one of a plurality of physical shared channels based upon the one or more parameters indicated in the single DCI.

34 Claims, 18 Drawing Sheets

(56) References Cited

U.S. PATENT DOCUMENTS

| | | | | |
|---|---|---|---|---|
| 2025/0016605 | A1* | 1/2025 | Lee | H04W 72/543 |
| 2025/0106169 | A1* | 3/2025 | Bagheri | H04L 1/1822 |
| 2025/0133568 | A1* | 4/2025 | Matsumura | H04W 72/04 |

* cited by examiner

700

RRC Configured Table with Delta Values from Nominal Values 702

| Entry | PDSCH 1 | PDSCH 2 | PDSCH 3 | PDSCH 4 |
| --- | --- | --- | --- | --- |
| 0 | Nom MCS + 1<br>Nom TDRA | Nom MCS + 2<br>Nom TDRA +1 | Non MCS + 2<br>Nom TDRA + 2 | Nom MCS + 2<br>Nom TDRA + 3 |
| 1 | Nom MCS + 2<br>Nom TDRA | Nom MCS + 4<br>Nom TDRA + 2 | Nom MCS + 2<br>Nom TDRA + 3 | Nom MCS + 4<br>Nom TDRA + 4 |
| ... | ... | ... | ... | ... |

CONFIGURATION FOR MULTIPLE PDSCH/PUSCH WITH DIFFERENT PARAMETERS USING DCI

TECHNICAL FIELD

The present disclosure relates generally to communication systems, and more particularly, to configuring channels with different parameters.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus includes a memory and at least one processor coupled to the memory and, based at least in part on information stored in the memory, the at least one processor is configured to: receive a single downlink control information (DCI) scheduling resources for a plurality of physical shared channel transmissions and indicating one or more parameters of each of the plurality of physical shared channel transmissions based on at least one of an entry in a table, a pattern, a linkage parameter, or a rule; and transmit or receive data over at least one of a plurality of physical shared channels based upon the one or more parameters indicated in the single DCI.

In an aspect of the disclosure, a method, a computer-readable medium, and an apparatus for wireless communication at a network node are provided. The apparatus includes a memory and at least one processor coupled to the memory and, based at least in part on information stored in the memory, the at least one processor is configured to: transmit a single downlink control information (DCI) scheduling resources for a plurality of physical shared channel transmissions and indicating one or more parameters of each of the plurality of physical shared channel transmissions based on at least one of an entry in a table, a pattern, a linkage parameter, or a rule; and transmit or receive data over at least one of a plurality of physical shared channels based upon the one or more parameters indicated in the single DCI.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
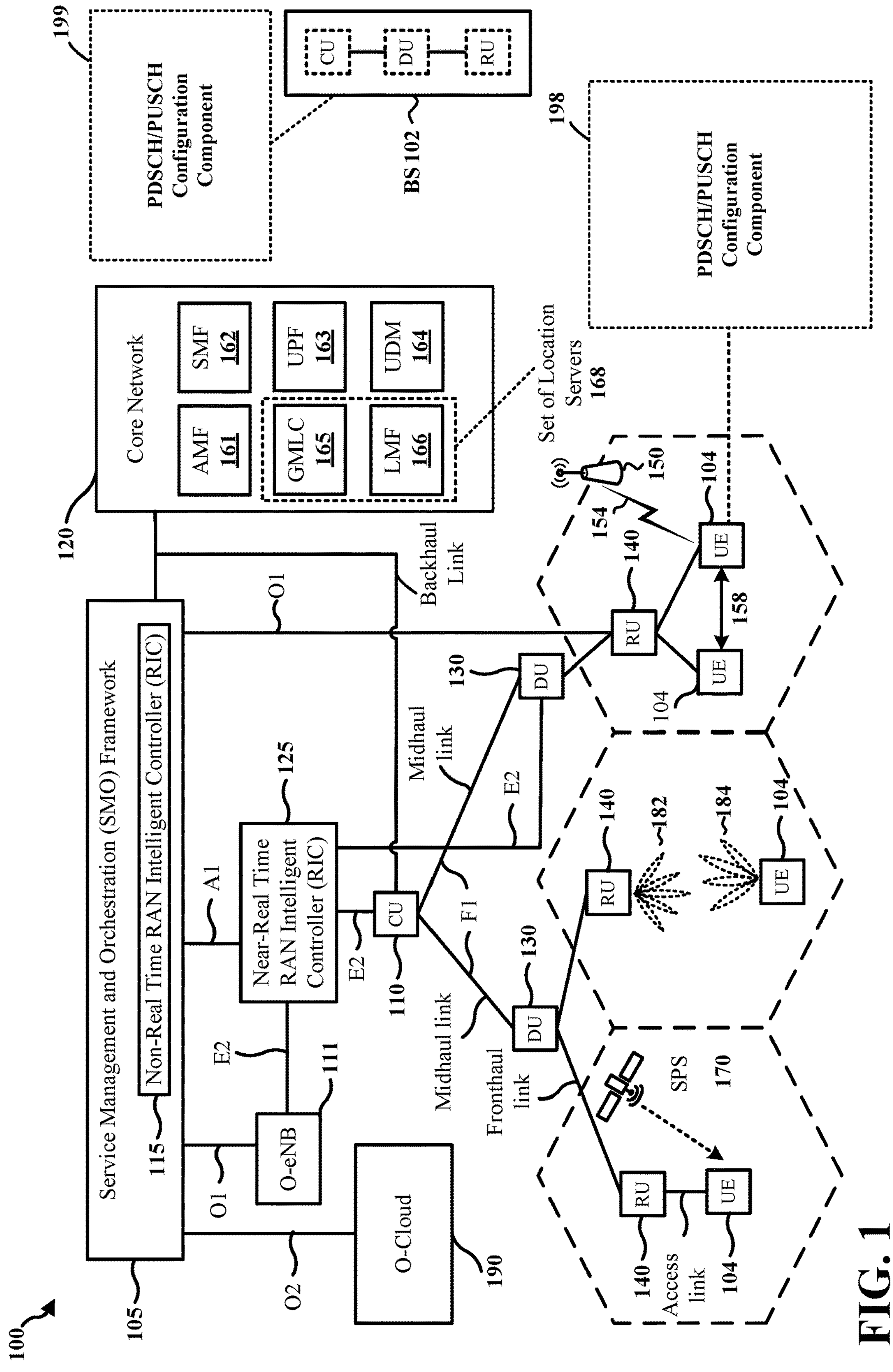
FIG. 1 is a diagram illustrating an example of a wireless communications system and an access network.

Some wireless communication systems may support a single DCI that includes multiple PDSCH/PUSCH grants, where values of parameters for each PDSCH/PUSCH are the same (e.g., a single type of MCS and a single type of FDRA for each PDSCH/PUSCH). Utilizing the same values for parameters for multiple PDSCHs/PUSCHs may be restrictive. In some configurations, a wireless communication system may support a single DCI that includes multiple PDSCH/PUSCH grants, where values of parameters for each of the PDSCHs/PUSCHs may vary. However, explicitly indicating the values of the parameters in a DCI for each of the PDSCHs/PUSCHs increases signaling overhead. Various aspects described herein relate to techniques to reduce signaling overhead of a DCI while providing for the indication of different parameters for multiple PDSCH/PUSCH scheduled in the DCI. In an example, a UE receives a single DCI scheduling resources for a plurality of physical shared channel transmissions and indicating one or more parameters of each of the plurality of physical shared channel transmissions based on at least one of an entry in a table, a pattern, a linkage parameter, or a rule. The UE transmits or receives data over at least one of a plurality of physical shared channels based upon the one or more parameters indicated in the single DCI. As the single DCI may not explicitly include values for parameters for the plurality of physical shared channel transmissions (e.g., PDSCH or PUSCH transmissions) vis-à-vis the entry in the table, the pattern, the linkage parameter, or the rule, signaling overhead may be reduced.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS (e.g., a gNB), 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions.

The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a PDSCH/PUSCH configuration component 198 that is configured to receive a single DCI scheduling resources for a plurality of physical shared channel transmissions and indicating one or more parameters of each of the plurality of physical shared channel transmissions based on at least one of an entry in a table, a pattern, a linkage parameter, or a rule and transmit or receive data over at least one of a plurality of physical shared channels based upon the one or more parameters indicated in the single DCI. In certain aspects, the base station 102 may include a PDSCH/PUSCH configuration component 199 that is configured to transmit a single DCI scheduling resources for a plurality of physical shared channel transmissions and indicating one or more parameters of each of the plurality of physical shared channel transmissions based on at least one of an entry in a table, a pattern, a linkage parameter, or a rule and transmit or receive data over at least one of a plurality of physical shared channels based upon the one or more parameters indicated in the single DCI. Although the following description may be focused on 5G NR, the concepts described herein may be applicable to other similar areas, such as LTE, LTE-A, CDMA, GSM, and other wireless technologies.

Figures 2A, 2B, 2C, 2D:
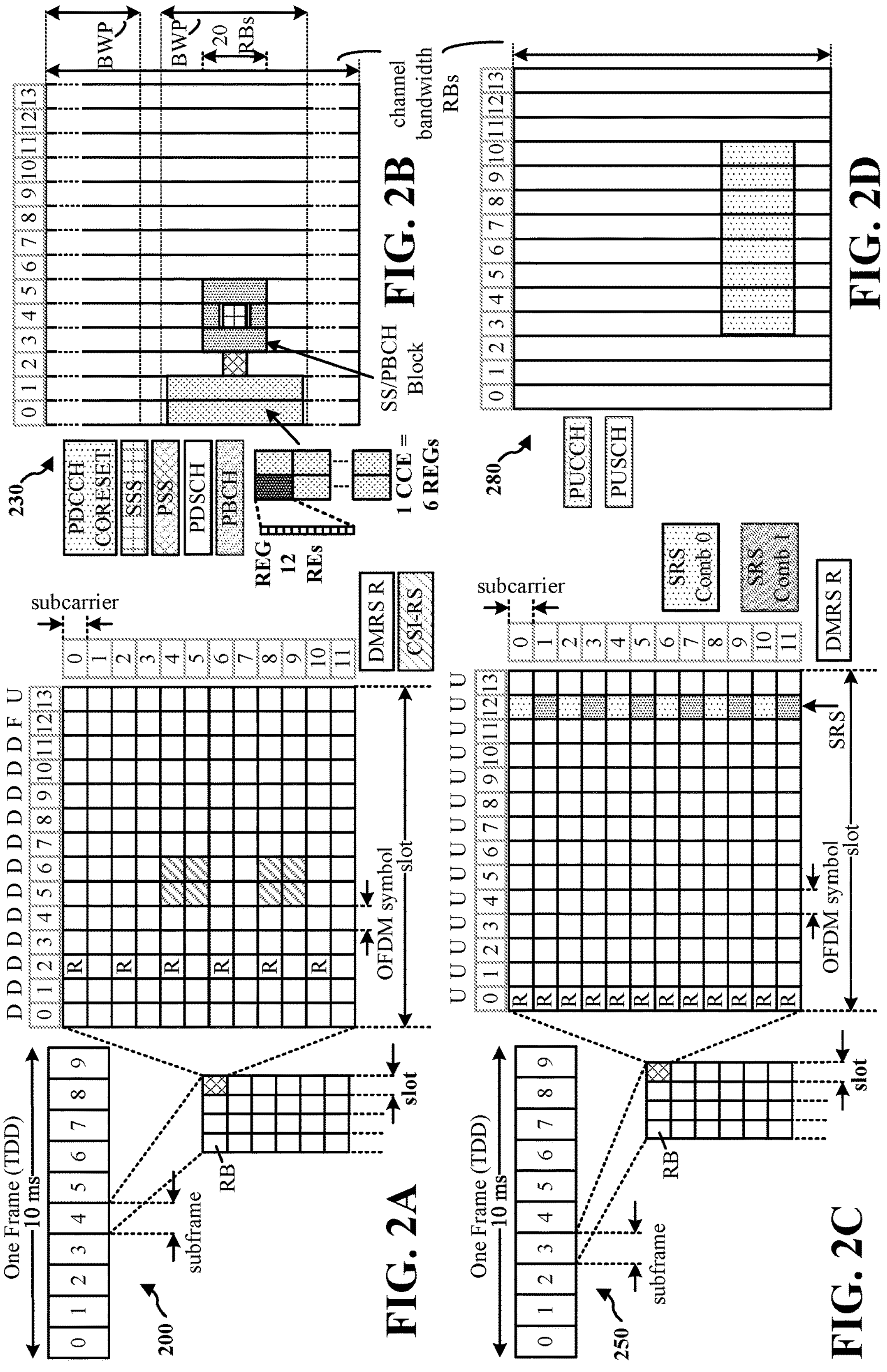
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2\mu{*}15^{kHz}$, where μ is the numerology 0 to 4. As such, the numerology μ=0 has a subcarrier spacing of 15 kHz and the numerology 1.1=4 has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
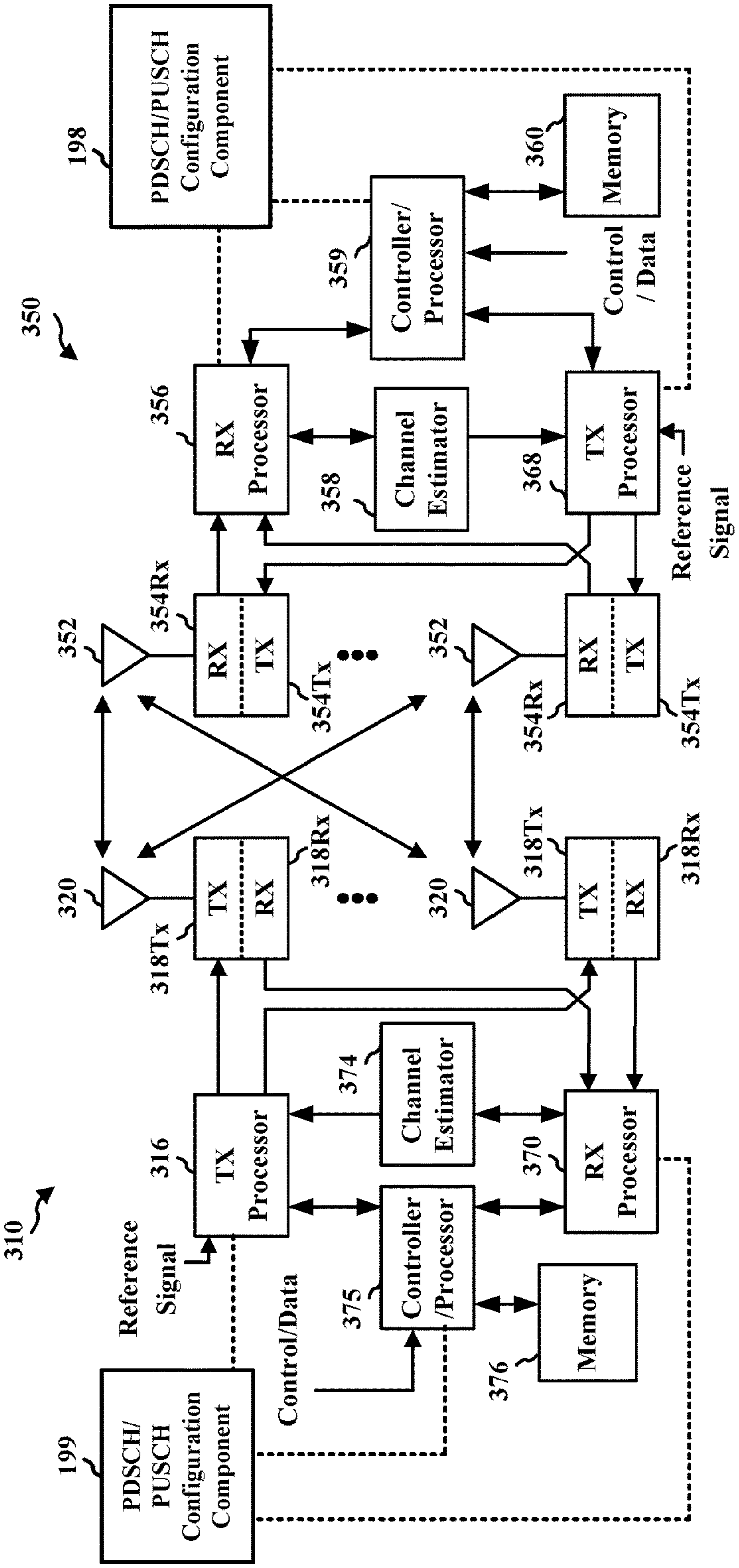
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the PDSCH/PUSCH configuration component 198 of FIG. 1.

At least one of the TX processor 316, the RX processor 370, and the controller/processor 375 may be configured to perform aspects in connection with the PDSCH/PUSCH configuration component 199 of FIG. 1.

Figure 4:
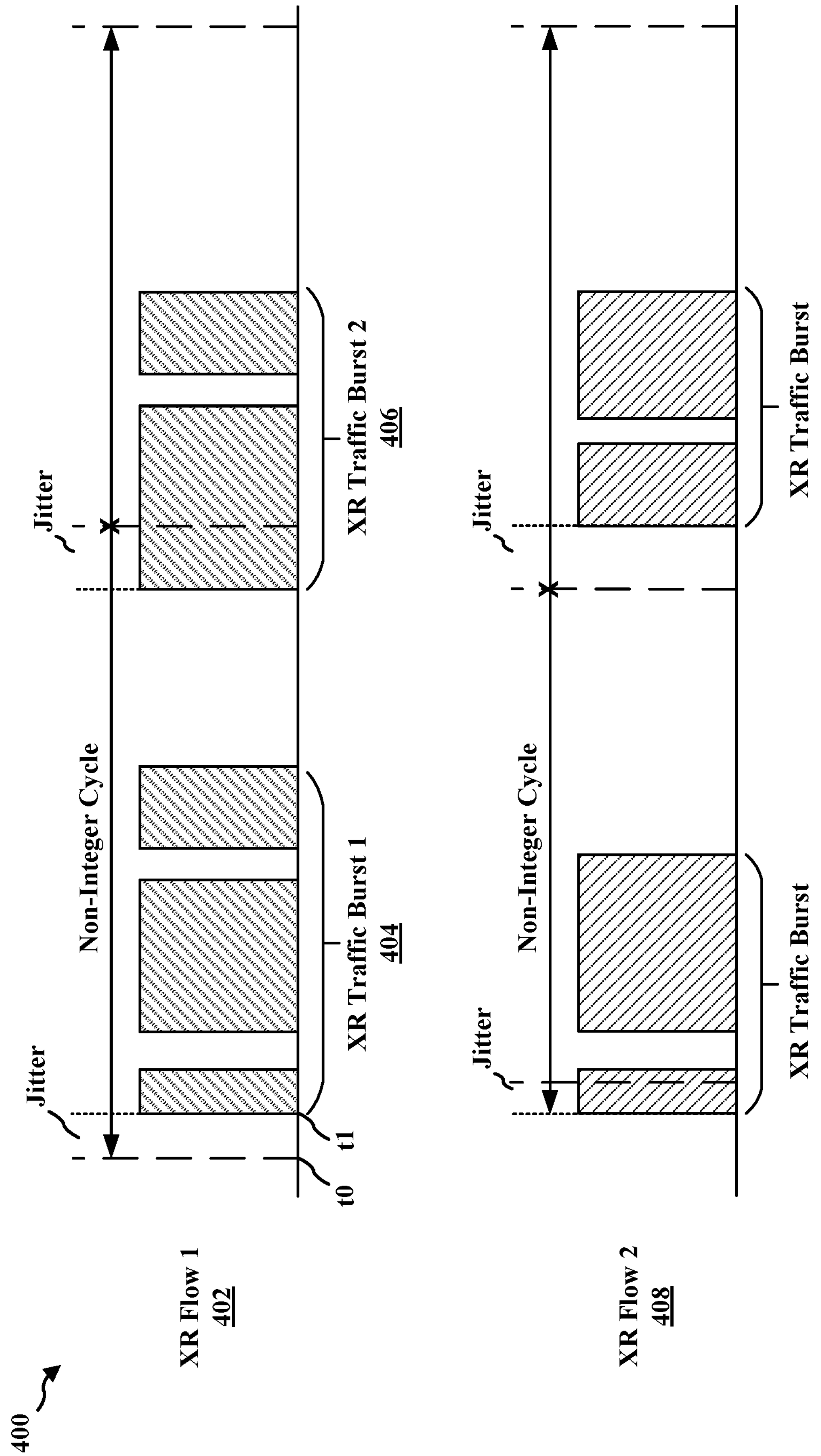
FIG. 4 is a diagram illustrating an example of extended reality (XR) traffic.

FIG. 4 is a diagram 400 illustrating example XR traffic. XR traffic may refer to wireless communications for technologies such as virtual reality (VR), mixed reality (MR), and/or augmented reality (AR). VR may refer to technologies in which a user is immersed in a simulated experience that is similar or different from the real world. A user may interact with a VR system through a VR headset or a multi-projected environment that generates realistic images, sounds, and other sensations that simulate a user's physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a natural environment and/or mask real objects from the natural environment. XR traffic may include video data and/or audio data. XR traffic may be transmitted by a base station and received by a UE or the XR traffic may be transmitted by a UE and received by a base station.

XR traffic may arrive in periodic traffic bursts ("XR traffic bursts"). An XR traffic burst may vary in a number of packets per burst and/or a size of each pack in the burst. The diagram 400 illustrates a first XR flow 402 that includes a first XR traffic burst 404 and a second XR traffic burst 406. As illustrated in the diagram 400, the traffic bursts may include different numbers of packets, e.g., the first XR traffic burst 404 being shown with three packets (represented as rectangles in the diagram 400) and the second XR traffic burst 406 being shown with two packets. Furthermore, as illustrated in the diagram 400, the three packets in the first XR traffic burst 404 and the two packets in the second XR traffic burst 406 may vary in size, that is, packets within the first XR traffic burst 404 and the second XR traffic burst 406 may include varying amounts of data.

XR traffic bursts may arrive at non-integer periods (i.e., in a non-integer cycle). The periods may be different than an integer number of symbols, slots, etc. In an example, for 60 frames per second (FPS) video data, XR traffic bursts may arrive in 1/60=16.67 ms periods. In another example, for 120 FPS video data, XR traffic bursts may arrive in 1/120=8.33 ms periods.

Arrival times of XR traffic may vary. For example, XR traffic bursts may arrive and be available for transmission at a time that is earlier or later than a time at which a UE (or a base station) expects the XR traffic bursts. The variability of the packet arrival relative to the period (e.g., 16.76 ms period, 8.33 ms period, etc.) may be referred to as "jitter." In an example, jitter for XR traffic may range from −4 ms (earlier than expected arrival) to +4 ms (later than expected arrival). For instance, referring to the first XR flow 402, a UE may expect a first packet of the first XR traffic burst 404 to arrive at time t0, but the first packet of the first XR traffic burst 404 arrives at time t1.

XR traffic may include multiple flows that arrive at a UE (or a base station) concurrently with one another (or within a threshold period of time). For instance, the diagram 400 includes a second XR flow 408. The second XR flow 408 may have different characteristics than the first XR flow 402. For instance, the second XR flow 408 may have XR traffic bursts with different numbers of packets, different sizes of packets, etc. In an example, the first XR flow 402 may include video data and the second XR flow 408 may include audio data for the video data. In another example, the first XR flow 402 may include intra-coded picture frames (I-frames) that include complete images and the second XR flow 408 may include predicted picture frames (P-frames) that include changes from a previous image.

XR traffic may have an associated packet delay budget (PDB). If a packet does not arrive within the PDB, a UE (or a base station) may discard the packet. In an example, if a packet corresponding to a video frame of a video does not arrive at a UE within a PDB, the UE may discard the packet, as the video has advanced beyond the frame.

In general, XR traffic may be characterized by relatively high data rates and low latency. The latency in XR traffic may affect the user experience. For instance, XR traffic may have applications in eMBB and URLLC services.

Some types of wireless communication systems may employ dynamic grants for scheduling purposes to accommodate traffic (e.g., XR traffic). In a dynamic grant, a scheduler may use control signaling to allocation resources for transmission or reception at a UE (e.g., a grant of UL or DL resources). Dynamic grants may be flexible and can adopt to variations in traffic behavior. A UE may monitor for a PDCCH including a DCI that schedules the UE to transmit or receive communication with a base station (e.g., instructions to receive data over a PDSCH). However, monitoring for a PDCCH consumes power at the UE, and can increase latency in communication between the UE and the base station as the UE waits for a resource assignment to transmit or receive communication. Some wireless communication systems may support a single DCI that includes multiple PDSCH/PUSCH grants, where parameters for each PDSCH/PUSCH are the same (e.g., a single type of modulation and coding scheme (MCS) and a single type of frequency domain resource allocation (FDRA) for each PDSCH/PUSCH). Utilizing the same parameters for multiple PDSCHs/PUSCHs may be restrictive. For example, as noted above, XR traffic may have jitter, different numbers of packets, packets of different lengths, and/or may arrive in non-integer cycles. In an example, if multiple PDSCHs share the same MCS/RB, a DCI granting the multiple PDSCHs may be dimensioned over a maximum packet size (which may be referred to as "over-dimensioning"), which may lead to time and/or frequency resources being under-utilized. In some configurations, a wireless communication system may support a single DCI that includes multiple PDSCH/PUSCH grants, where parameters for each of the PDSCHs/PUSCHs may vary. However, explicitly indicating the parameters in a DCI for each of the PDSCHs/PUSCHs may be associated with increased signaling overhead.

Various aspects described herein relate to techniques to reduce signaling overhead of a DCI that specifies parameters of multiple PDSCHs/PUSCHs, where some or all of the values of the parameters may vary between the multiple PDSCHs/PUSCHs. In some aspects, the DCI indicates an entry in a table, a pattern, a linkage parameter, or a rule. The aforementioned DCI may reduce signaling overhead, as the DCI may not explicitly include values for each of the parameters.

In an example, a UE receives a single DCI scheduling resources for a plurality of physical shared channel transmissions and indicating one or more parameters of each of the plurality of physical shared channel transmissions based on at least one of an entry in a table, a pattern, a linkage parameter, or a rule. The UE transmits or receives data over at least one of a plurality of physical shared channels based upon the one or more parameters indicated in the single DCI. As the single DCI may not explicitly include values for parameters for the plurality of physical shared channel transmissions (e.g., PDSCH or PUSCH transmissions) vis-à-vis the entry in the table, the pattern, the linkage parameter, or the rule, signaling overhead may be reduced.

Figure 5:
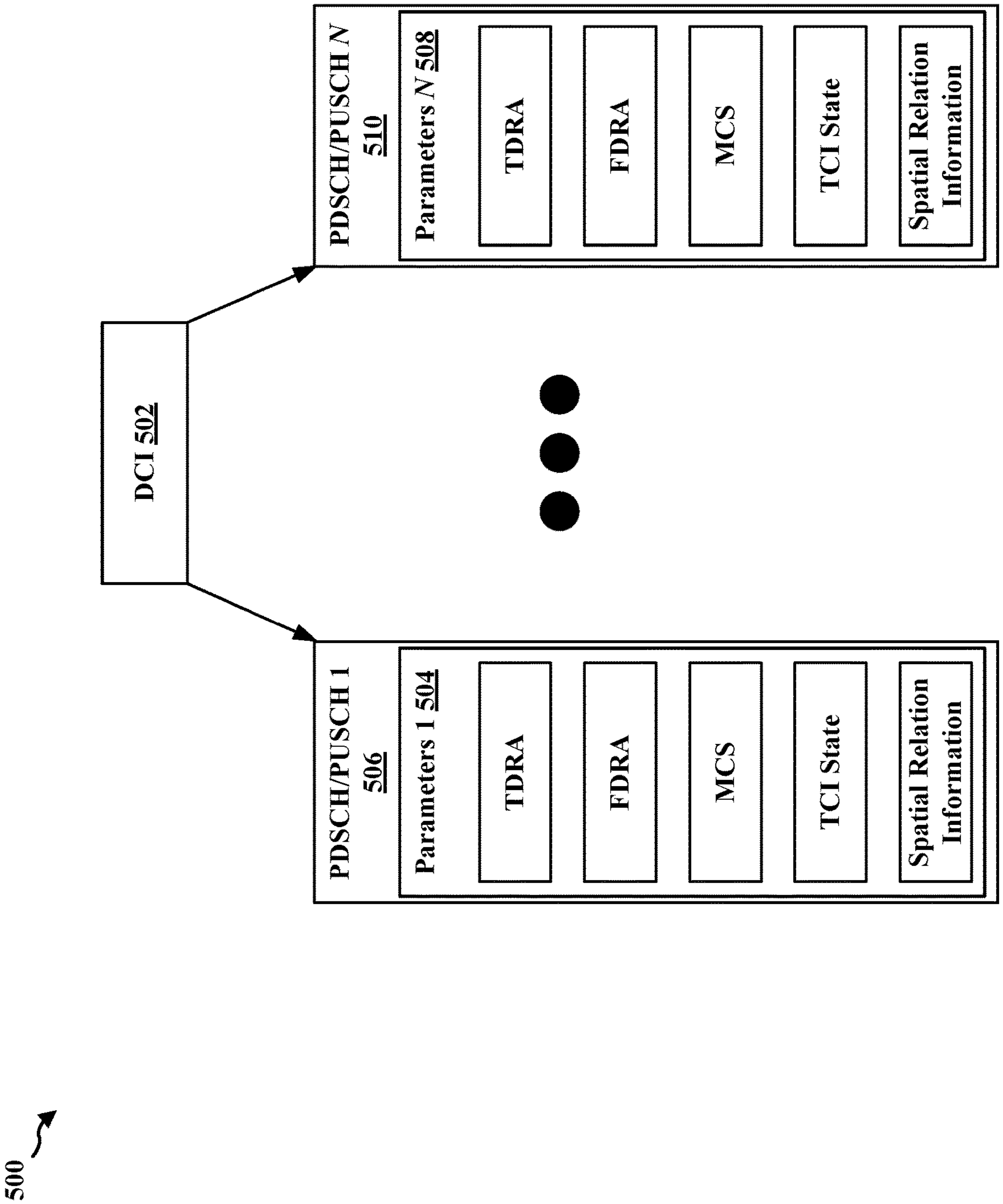
FIG. 5 is a diagram illustrating an example of downlink control information (DCI) that changes parameters of multiple physical downlink shared channels (PDSCHs) and/or multiple physical uplink shared channels (PUSCHs).

FIG. 5 is a diagram 500 illustrating an example of a DCI that indicates parameters for multiple PDSCHs/PUSCHs. The diagram 500 includes a DCI 502. The DCI 502 may include information indicating one or more parameters of multiple PDSCHs/PUSCHs. A base station may transmit a configuration to a UE via RRC signaling that configures the UE for parameter adaptation of the multiple PDSCHs/PUSCHs. The DCI 502 may cause the UE to apply first parameters 504 to a first PDSCH/PUSCH 506 and Nth parameters 508 to a Nth PDSCH/PUSCH 510, where N is a positive integer greater than one. The first PDSCH/PUSCH 506 may be a first PDSCH or a first PUSCH. The Nth PDSCH/PUSCH 510 may be a second PDSCH or a second PUSCH. The first parameters 504 and the Nth parameters 508 may include a time domain resource assignment (TDRA), a FDRA, a MCS, a transmission configuration indication (TCI) state, and/or spatial relation information. Values of the first parameters 504 and the Nth parameters 508 may be different. In an example, the first parameters 504 include a first value associated with a first TCI state and the Nth parameters 508 include a second value associated with a second TCI state. In another example, the first parameters 504 include a MCS 5 and the Nth parameters 508 include a MCS 7. In an example, a bit in the DCI 502 (or a bit in a RRC communication) may indicate whether same or different values are to be used for the first parameters 504 for the first PDSCH/PUSCH 506 and Nth parameters 508 to a Nth PDSCH/PUSCH 510, e.g., whether the UE is to use the same or different values for multiple PDSCHs/PUSCHs scheduled by a single DCI.

Figure 12:
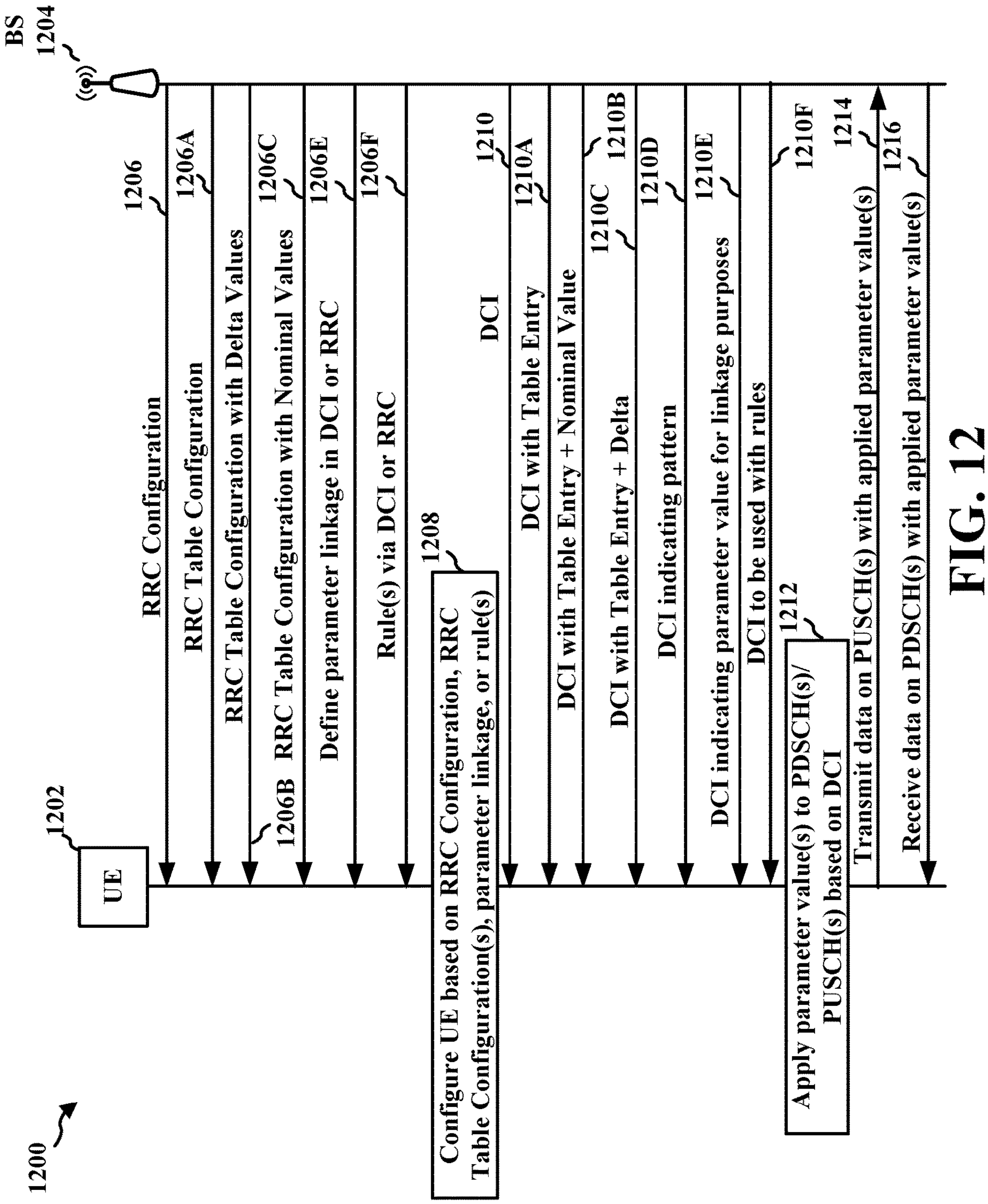
FIG. 12 is a diagram illustrating example communications between a user equipment (UE) and a base station (BS).

FIG. 12 includes a communication flow diagram 1200 that depicts example communication between a UE 1202 and a base station 1204. In an example, at 1206, FIG. 12 shows that the base station 1204 may transmit a configuration via RRC signaling to the UE 1202. The configuration may indicate for the UE to apply the same value or different values for multiple PDSCHs/PUSCHs scheduled by a single DCI. At 1208, FIG. 12 shows that the UE 1202 may apply the RRC configuration, e.g., for uplink or downlink configuration. For example, if the RRC configuration, e.g., at 1206) indicates for the UE to apply the same TDRA, FDRA, MCS, TCI state, and/or spatial relation value for multiple PDSCHs/PUSCHs scheduled by a single DCI, the UE may apply the same value for PUSCHs transmitted by the UE or for PDSCHs received by the UE. If the RRC configuration indicates for the UE to use different values (e.g., different TDRA, FDRA, MCS, TCI state, and/or spatial relation) for the PUSCHs/PDSCHs scheduled by a single DCI, the UE may transmit the PUSCHs using different TDRA, FDRA, MCS, TCI state and/or spatial relation or may receive the PDSCHs using different TDRA, FDRA, MCS, TCI state and/or spatial relation. At 1210, FIG. 12 shows that the base station 1204 may transmit a DCI to the UE 1202, where the DCI may indicate values of one or more parameters that are to be applied to multiple PDSCHs/PUSCHs. At 1212, FIG. 12 shows that the UE may apply the values of the one or more parameters to the multiple PDSCHs/PUSCHs based upon the DCI. The application, at 1212, may be further based on the RRC configuration received at 1206. At 1214, FIG. 12 shows that the UE 1202 may transmit data on one or more PUSCHs having the applied parameter values. In an example, the UE 1202 may transmit first data on a first PUSCH having first values for the parameters (e.g., MCS 5 and FDRA 1) and second data on a second PUSCH having second values (e.g., MCS 4 and FDRA 2) for the parameters. The first values for the parameters and the second values for the parameters may be different. At 1216, FIG. 12 shows that the UE 1202 may receive data on one or more PDSCHs having applied parameter values. In an example, the UE 1202 may receive third data on a first PDSCH having third values for the parameters (e.g., MCS 7 and FDRA 1) and fourth data on a second PDSCH having fourth values for the parameters (e.g., MCS 7 and FDRA 3). The third values for the parameters and the fourth values for the parameters may be different.

Figure 6:
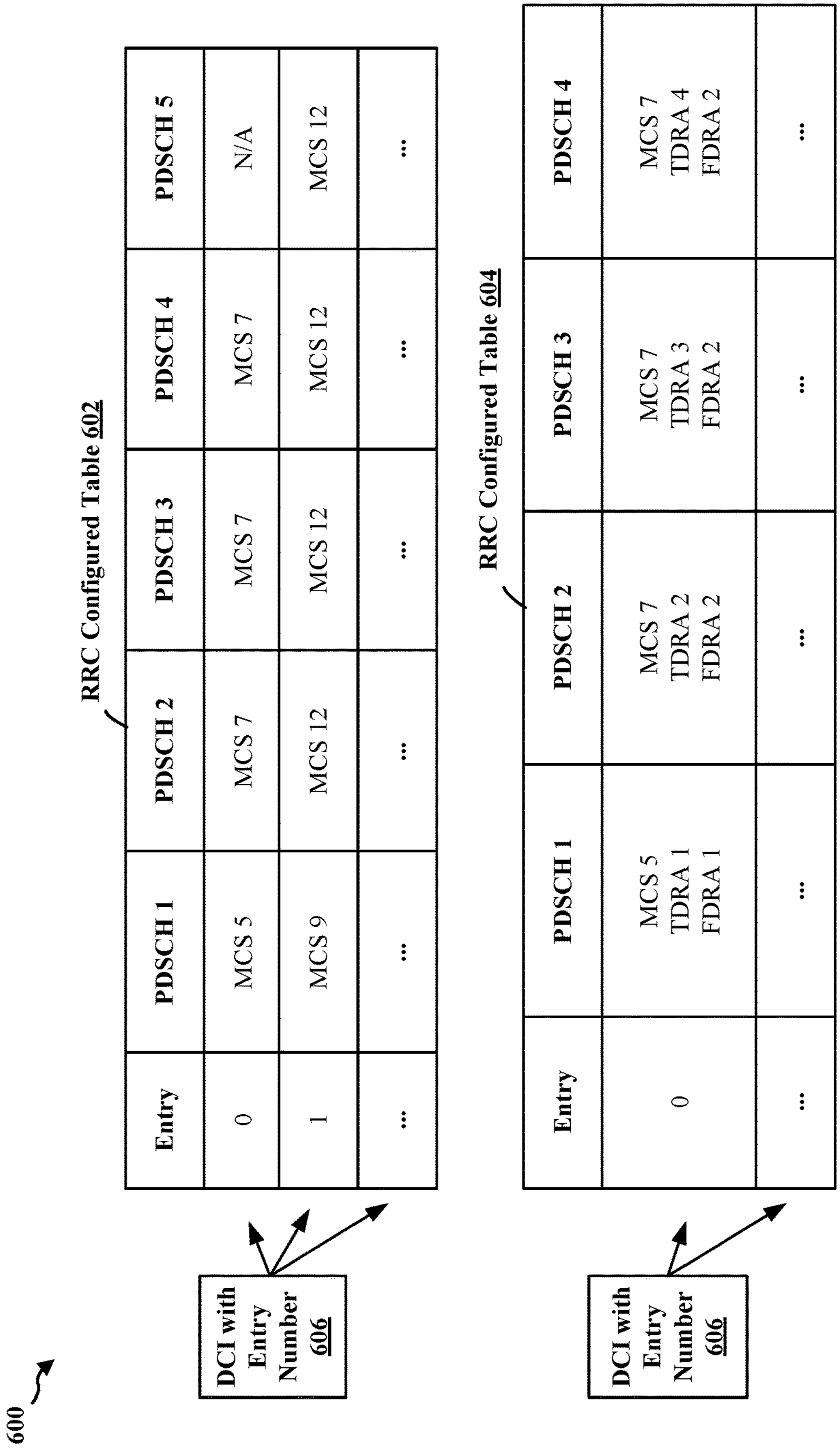
FIG. 6 is a diagram illustrating example tables that include parameters for PDSCHs/PUSCHs.

FIG. 6 is a diagram 600 illustrating an example of a first RRC configured table 602 and a second RRC configured table 604. In an example, FIG. 12 at 1206A shows that the base station 1204 may transmit an RRC table configuration to the UE 1202 with different combinations of PUSCH or PDSCH parameters to be applied for the multiple PUSCH/PDSCH. In an example, the network may provide one or more RRC table configurations, e.g., such as the first RRC configured table 602 and/or the second RRC configured table 604. At 1208, the UE may use the RRC table configurations in connection with the DCI received at 1210 (e.g., 1210A).

The first RRC configured table 602 may include a first dimension and a second dimension, where the first dimension corresponds to different entries and the second dimension corresponds to different PDSCHs and/or PUSCHs. In an example, the first RRC configured table 602 may include entries (e.g., entry 0, entry 1, etc.), where each entry may correspond to a different row in the first RRC configured table 602. The first RRC configured table 602 may include columns corresponding to different PDSCHs and/or PUSCHs used for reception and transmission of data at a UE, respectively. The first RRC configured table 602 may include values for parameters of different PDSCHs/PUSCHs. The values for the parameters may refer to a defined table. In an example, for entry 0-PDSCH 1, the first RRC configured table 602 may indicate that MCS 5 is to be utilized, that is, PDSCH 1 may be configured with MCS 5. In another example, for entry 1-PDSCH 2, the first RRC configured table 602 may indicate that MCS 12 is to be utilized, that is, PDSCH 2 may be configured with MCS 12. In an example, MCS 12 may refer to a value in the defined table. Each entry in the first RRC configured table 602 may be associated with the same or different numbers of PDSCHs/PUSCHs. For example, in the first RRC configured table 602, entry 0 is associated with PDSCH 1-4 and entry 1 is associated with PDSCH 1-5.

The second RRC configured table 604 may be similar to the first RRC configured table 602; however, the second RRC configured table 604 may include multiple values for a combination of multiple different parameters of different PDSCHs and/or PUSCHs. For example, for entry 0-PDSCH 1, the second RRC configured table 604 indicates that MCS 5, TDRA 1, and FDRA 1 are to be utilized, that is, PDSCH 1 is to be configured with MCS 5, TDRA 1, and FDRA 1. Although not illustrated in the diagram 600, it is to be understood that each entry in the second RRC configured table 604 may be associated with the same or different numbers of PDSCH/PUSCHs.

A base station may transmit a DCI 606 that includes an entry number corresponding to an entry in the first RRC configured table 602 or the second RRC configured table 604. The entry in the DCI may correspond to an index in the first RRC configured table 602 or the second RRC configured table 604. The UE may select one or more values for one or more parameters from the first RRC configured table 602 or the second RRC configured table 604 based upon the entry number included in the DCI 606. In an example with respect to the first RRC configured table 602 in which the DCI 606 includes "0" as the entry number, the UE may select MCS 5 for PDSCH 1, MCS 7 for PDSCH 2, and so forth. In another example with respect to the second RRC configured table 604 in which the DCI 606 includes "0" as the entry number, the UE may select MCS 5, TDRA 1, and FDRA 1 for PDSCH 1, MCS 7, TDRA 2, and FDRA 2 for PDSCH 2, and so forth.

In a further example, FIG. 12 at 1210A shows that the UE 1202 may receive a DCI that includes a table entry. At 1212, the UE 1202 may apply values to parameters of PDSCH(s)/PUSCH(s) based upon the table entry. At 1214, the UE 1202 may transmit data on a PUSCH (or PUSCHs) having parameters with the values. At 1216, the UE 1202 may receive data on a PDSCH (or PDSCHs) having parameters with the values. As the DCI received at 1210A specifies a table entry that includes values for the parameters (as opposed to a DCI that explicitly indicates each of the values), the DCI may be associated with reduced signaling overhead.

Figure 7:
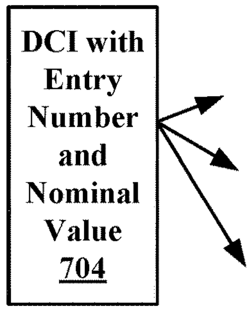
FIG. 7 is a diagram illustrating an example table that includes delta values for parameters for PDSCHs/PUSCHs.

FIG. 7 is a diagram 700 illustrating an example of a RRC configured table 702. The RRC configured table 702 provides for different parameters to be applied for different PDSCHs/PUSCHs scheduled by a single DCI, similar to FIG. 6. In contrast to FIG. 6, the RRC configured table 702 in FIG. 7 may provide delta values for parameters relative to a nominal value (e.g., nominal MCS "Nom MCS", nominal TDRA "Nom TDRA", etc.). The nominal value may also be referred to as a reference value or an indicated value. The nominal value (e.g., reference value or indicated value) may be provided in the DCI (e.g., 1210 or 1210B). The UE then applies the nominal value received in the DCI and the delta value from the RRC configured table entry. In an example, FIG. 12 at 1206B shows that the base station 1204 may transmit an RRC table configuration (with delta values) to the UE 1202. In an example, the RRC table configuration may configure the RRC configured table 702. At 1208, the UE 1202 may configure the UE 1202 based upon the RRC table configuration (with delta values).

The RRC configured table 702 may include a first dimension and a second dimension, where the first dimension corresponds to different entries and the second dimension corresponds to different PDSCHs and/or PUSCHs. In an example, the RRC configured table 702 may include entries (e.g., entry 0, entry 1, etc.), where each entry may correspond to a different row in the RRC configured table 702. The RRC configured table 702 may include columns corresponding to different PDSCHs and/or PUSCHs used for reception and transmission of data at a UE, respectively. The RRC configured table 702 may include delta values for parameters of different PDSCHs/PUSCHs. In an example, for entry 0-PDSCH 2, the RRC configured table 702 may indicate a delta value of "2" for MCS and a delta value of "1" for TDRA.

A base station may transmit a DCI 704 that includes an entry number corresponding to an entry in the RRC configured table 702 and a nominal value (or nominal values). The UE may select one or more values for one or more parameters from the RRC configured table 702 based upon the entry number, the nominal value(s) in the DCI 704, and the delta value(s). For example, the DCI 704 may include "0" as the entry number, a MC S nominal value of "9", and a TDRA nominal value of "1." In the example, the UE may select MCS 10 (nominal value 9+delta value 1) and TDRA 1 (nominal value 1+delta value 0) for PDSCH 1, MCS 11 (nominal value 9+delta value 2) and TDRA 2 (nominal value 1+delta value 1) for PDSCH 2, and so forth. Values for MCS 10, TDRA 1, MCS 11, and TDRA 2 may refer to a defined table. Although not illustrated in the diagram 700, each entry in the RRC configured table 702 may be associated with the same or different numbers of PDSCH/PUSCHs.

In a further example, FIG. 12 at 1210B shows that the UE 1202 may receive a DCI that includes a table entry referenced in an RRC configured table and a nominal value (or nominal values). At 1212, the UE 1202 may apply values to parameters of PDSCH(s)/PUSCH(s) based upon the table entry, the nominal value(s) in the DCI, and delta values in the RRC configured table. At 1214, the UE 1202 may transmit data on a PUSCH (or PUSCHs) having parameters with the values. At 1216, the UE 1202 may receive data on a PDSCH (or PDSCHs) having parameters with the values. As the DCI received at 1210B specifies a nominal value (or values) and a table entry that includes delta values for the parameters (as opposed to a DCI that explicitly indicates each of the values), the DCI may be associated with reduced signaling overhead.

Figure 8:
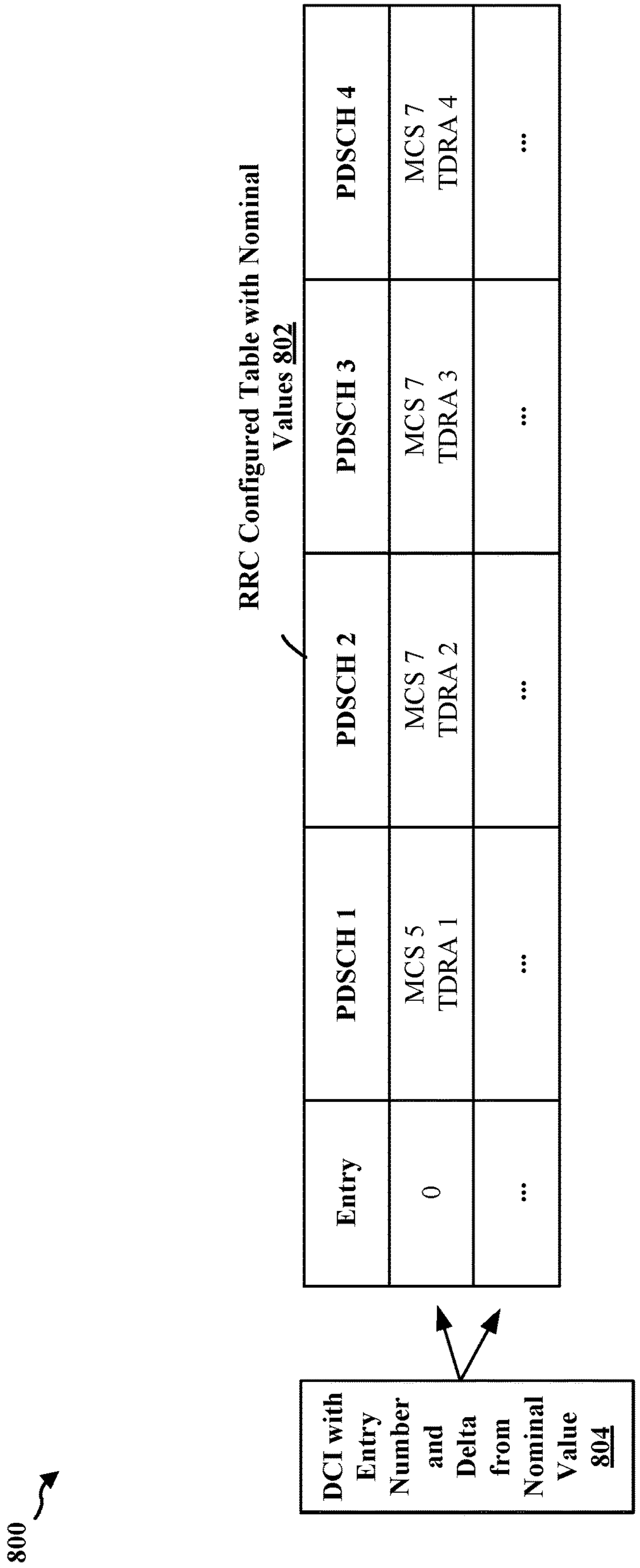
FIG. 8 is a diagram illustrating an example table that includes nominal values for parameters for PDSCHs/PUSCHs.

FIG. 8 is a diagram 800 illustrating an example of a RRC configured table 802. The RRC configured table 802 may be configured with nominal values for parameters, and the DCI (e.g., 1210C) may indicate a delta value to be applied to the corresponding nominal values indicated in the table. In an example, FIG. 12 at 1206C shows that the base station 1204 may transmit an RRC table configuration (with nominal values) to the UE 1202. In an example, the RRC table configuration may configure the RRC configured table 802. At 1208, the UE 1202 may configure the UE 1202 based upon the RRC table configuration (with nominal values).

The RRC configured table 802 may include a first dimension and a second dimension, where the first dimension corresponds to different entries and the second dimension corresponds to different PDSCHs and/or PUSCHs. In an example, the RRC configured table 802 may include entries (e.g., entry 0, entry 1, etc.), where each entry may correspond to a different row in the RRC configured table 802. The RRC configured table 802 may include columns corresponding to different PDSCHs and/or PUSCHs used for reception and transmission of data at a UE, respectively. The RRC configured table 802 may include nominal values for parameters of different PDSCHs/PUSCHs. In an example, for entry 0-PDSCH 2, the RRC configured table 702 may indicate a nominal value of “7” for MCS and a nominal value of “2” for TDRA.

A base station may transmit a DCI 804 that includes an entry number corresponding to an entry in the RRC configured table 802 and a delta value (or delta values). The UE may select one or more values for one or more parameters from the RRC configured table 802 based upon the entry number, the delta value(s) in the DCI 804, and the nominal value(s). For example, the DCI 804 may include “0” as the entry number, a delta value of “1” for MCS, and a delta value of “1” for TDRA. In the example, the UE may select MCS 6 (delta value 1+nominal value 5) and TDRA 2 (delta value 1+nominal value 1) for PDSCH 1, MCS 8 (delta value 1+nominal value 7) and TDRA 3 (delta value 1+nominal value 2) for PDSCH 2, and so forth. Values for MCS 6, MCS 8, TDRA 2, and TDRA 3 may refer to a defined table. Although not illustrated in the diagram 800, each entry in the RRC configured table 802 may be associated with the same or different numbers of PDSCH/PUSCHs.

In a further example, FIG. 12 at 1210C shows that the UE 1202 may receive a DCI that includes a table entry referenced in an RRC configured table and a delta value (or delta values). At 1212, the UE 1202 may apply values to parameters of PDSCH(s)/PUSCH(s) based upon the table entry, the delta value(s) in the DCI, and nominal values from the RRC configured table. At 1214, the UE 1202 may transmit data on a PUSCH (or PUSCHs) having parameters with the values. At 1216, the UE 1202 may receive data on a PDSCH (or PDSCHs) having parameters with the values. As the DCI received at 1210C specifies a delta value (or values) and a table entry that includes nominal values for the parameters (as opposed to a DCI that explicitly indicates each of the values), the DCI may be associated with reduced signaling overhead.

Figure 9:
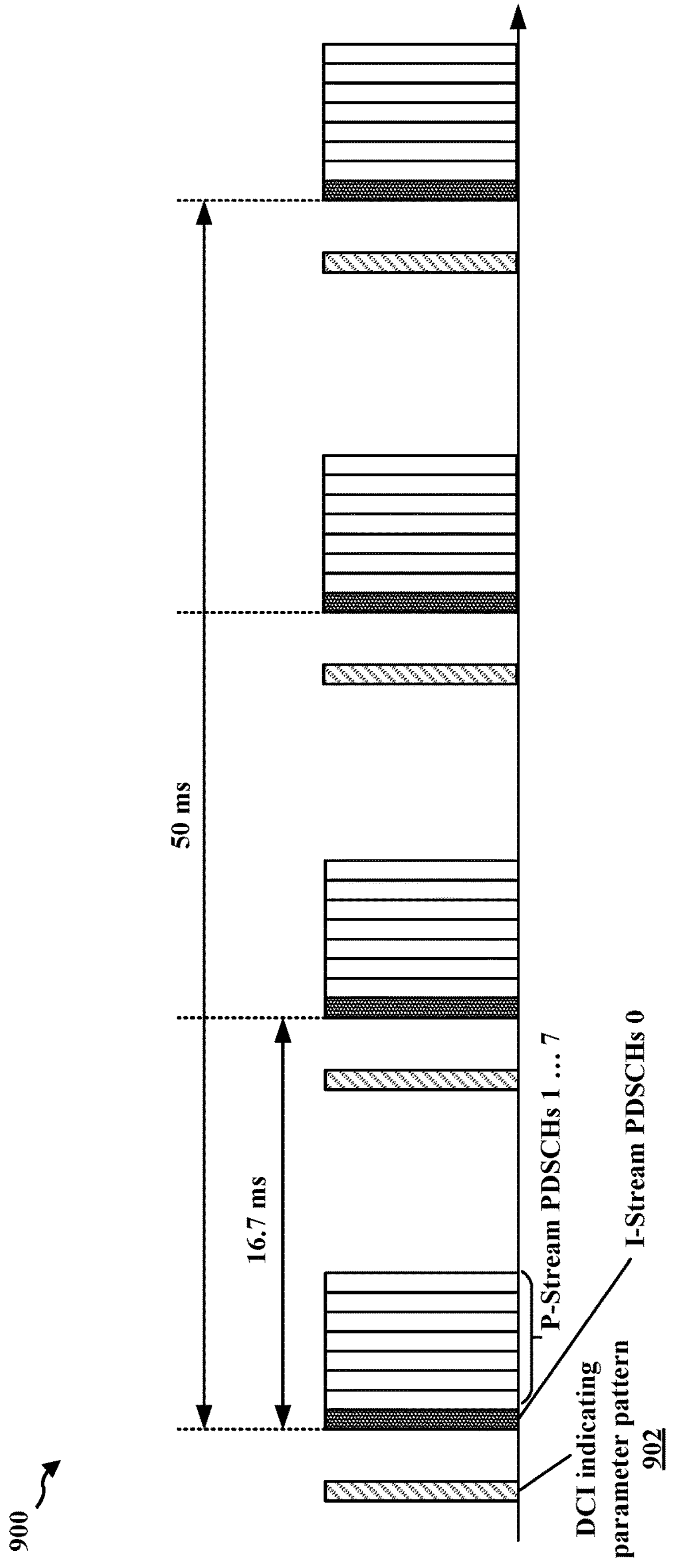
FIG. 9 is a diagram illustrating packets associated with different streams.

In one aspect, a DCI (e.g., the DCI 502) may indicate a pattern for DL or UL traffic (e.g., a pattern for packets in DL or UL traffic that are carried on PDSCHs or PUSCHs, respectively), where the DCI indicates values for parameters that are to be applied to the DL or UL traffic conforming to the pattern (e.g., values for parameters that are to be applied to PDSCHs or PUSCHs that carry packets corresponding to the DL or UL traffic). A DCI indicating a pattern may be useful in scenarios in which data is transmitted or received over multiple streams (e.g., two streams), as multiple streams may be associated with limited overhead. FIG. 9 is a diagram 900 illustrating packets associated with different streams. In an example, the different streams may be associated with XR traffic. The different streams may be received by a UE.

The diagram 900 illustrates an example of a sliced-based stream that includes an intra-coded picture frame stream (I-stream) and a predicted picture frame stream (P-stream). The I-stream and the P-stream may be associated with a periodic traffic pattern at 60 FPS (i.e., 16.67 ms periods). The I-stream and the P-stream may be associated with the same jitter model. The I-stream may include a complete image and the P-stream may include changes in the complete image from a previous frame. In an example, the I-stream may include one packet per stream at a time and the P-stream may include seven packets per stream at a time. In an example, a UE may receive a DCI 902 that indicates a pattern for the I-stream and the P-stream. The pattern may indicate that MCS 10 and FDRA 1 are to be utilized for PDSCH 10000000 (e.g., a packet in the I-stream is to be transmitted over PDSCH 0 having MCS 10 and FDRA 1) and MCS 7 and FDRA 2 are to be utilized for PDSCH 01111111 (e.g., packets in the P-stream are to be transmitted over PDSCHs 1-7 that each have MCS 7 and FDRA 2).

In an example, FIG. 12 at 1210D shows the UE 1202 may receive a DCI that indicates a pattern from the base station 1204, where the DCI may indicate values for parameters that are to be applied to PDSCHs/PUSCHs that conform to the pattern. At 1212, the UE 1202 may apply the values for the parameters to the PDSCHs/PUSCHs. At 1214, the UE 1202 may transmit data on a PUSCH (or PUSCHs) having parameters with the values. At 1216, the UE 1202 may receive data on a PDSCH (or PDSCHs) having parameters with the values.

Figure 10:
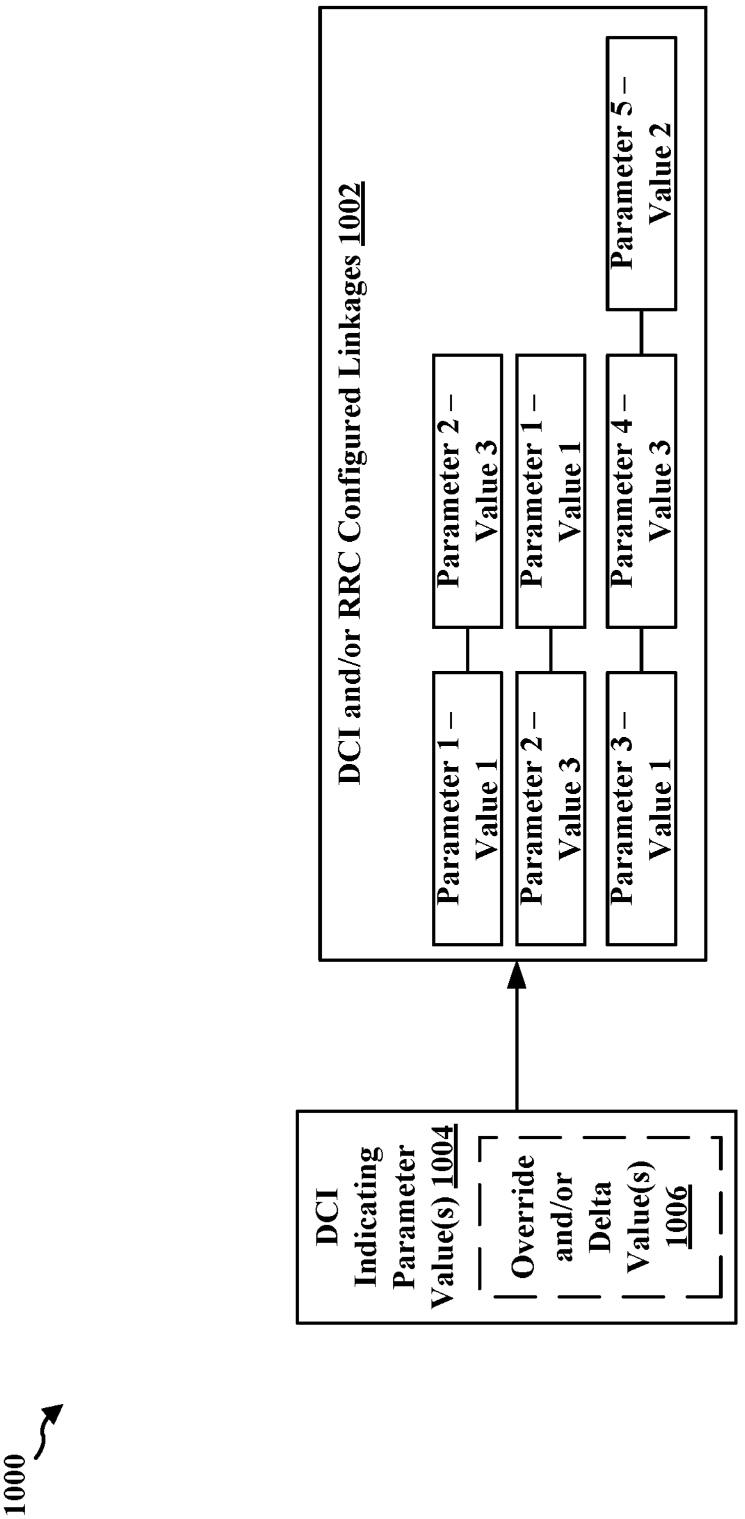
FIG. 10 is a diagram illustrating example parameter linkages.

FIG. 10 is a diagram 1000 illustrating example parameter linkages. A UE may receive, via DCI or RRC and from a base station, configured linkages 1002. In an example, FIG. 12 at 1206E shows the UE 1202 receiving a parameter linkage definition from the base station 1204. At 1208, the UE 1202 may configure the UE 1202 based upon the parameter linkage definition.

The configured linkages 1002 may indicate a value for a parameter of a PDSCH/PUSCH that is linked to a value for a different parameter of the PDSCH/PUSCH. In an example, the configured linkages 1002 indicate that a PDSCH/PUSCH having a first value for a first parameter (e.g., MCS) also has a third value for a third parameter (e.g., TDRA). Although not illustrated in the diagram 1000, it is to be understood that the configured linkages 1002 may include linkages for different PDSCHs/PUSCHs.

A UE may receive a DCI 1004 that includes value(s) for parameter(s) for PDSCH(s)/PUSCH(s). The UE may select value(s) for other parameters for the PDSCH(s)/PUSCH(s) based upon the value(s) for the parameter(s) in the DCI 1004. In an example, the DCI 1004 indicates that a PDSCH is to have value 1 for MCS (e.g., MCS 1). Using the configured linkages 1002, the UE may select value 3 for TDRA (e.g., TDRA 3). It is to be understood that a value for a parameter of a PDSCH/PUSCH may be linked to multiple values for multiple parameters for the PDSCH/PUSCH.

In some aspects, the DCI 1004 may include override value(s) 1006 for parameter(s) of PDSCH(s)/PUSCH(s). When the DCI 1004 includes the override value(s) 1006, the UE may apply the override value(s) to the parameter(s) of the PDSCH(s)/PUSCH(s) instead of values in the configured linkages 1002. In some aspects, the override value(s) 1006 may be delta values that are applied to values in the configured linkages 1002.

In an example, FIG. 12 at 1210E shows the UE 1202 receiving a DCI indicating a parameter value for linkage purposes. At 1212, the UE 1202 applies values to parameters of PDSCH(s)/PUSCH(s) based upon the DCI and the parameter linkage definition received at 1206E. At 1214, the UE 1202 may transmit data on a PUSCH (or PUSCHs) having parameters with the values. At 1216, the UE 1202 may receive data on a PDSCH (or PDSCHs) having parameters with the values.

Figure 11:
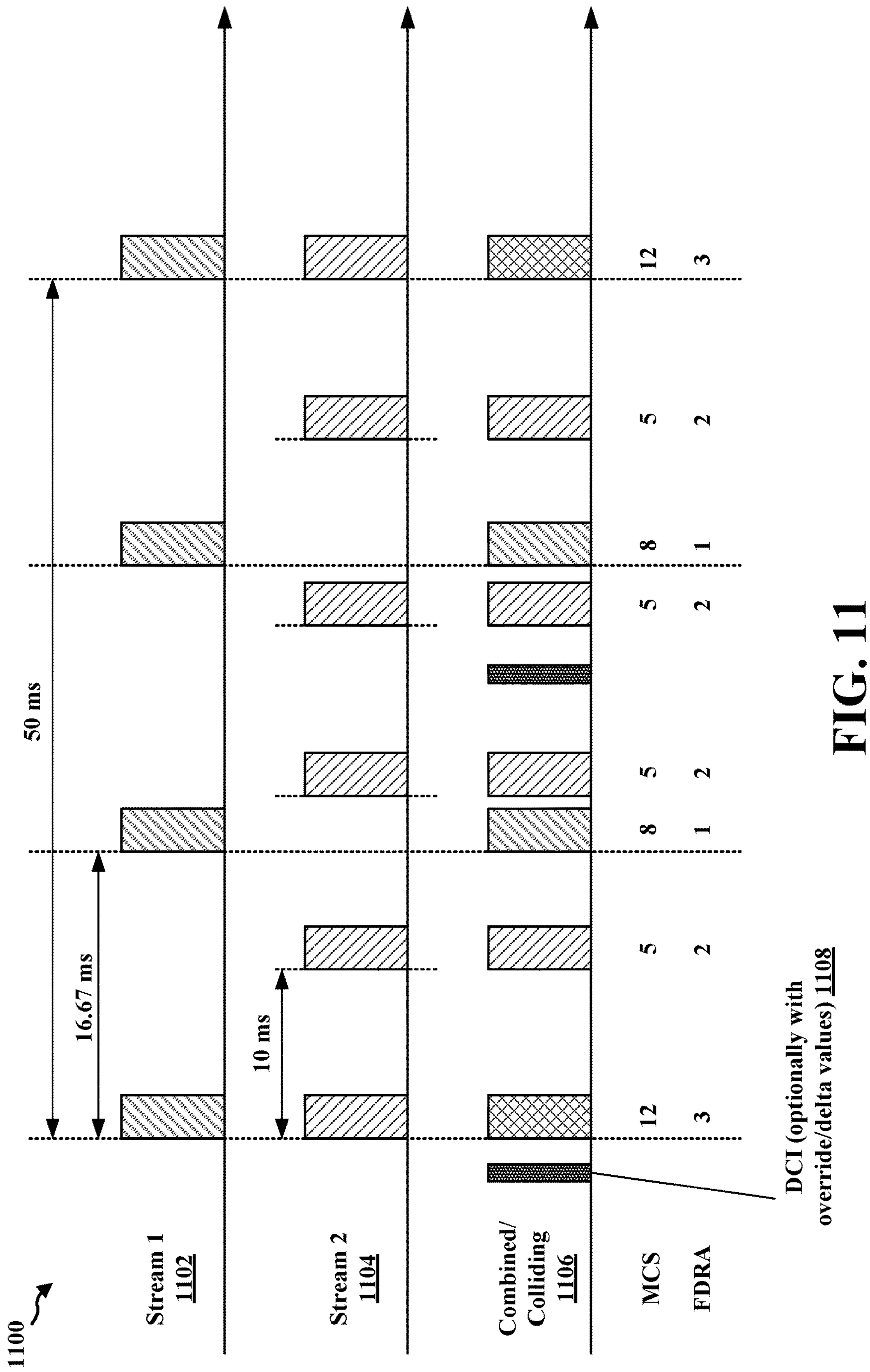
FIG. 11 is a diagram illustrating example traffic streams.

In one aspect, a DCI (e.g., the DCI 502) may indicate a rule, where the rule may be configured by DCI and/or RRC. In some aspects, a UE may be RRC configured to apply a linkage, such as described in connection with FIG. 10, or another rule. The DCI scheduling the PDSCHs/PUSCHs may include an indication that overrides the previously configured linkage or rule. In an example, FIG. 12 at 1206F shows the base station 1204 transmitting a rule or (rules) via DCI or RRC. Values for parameters for PDSCHs/PUSCHs may be implicitly determined based upon the rule(s). FIG. 11 is a diagram 1100 illustrating example traffic streams. The diagram 1100 depicts a first stream 1102 and a second stream 1104. The first stream 1102 and the second stream 1104 may be associated with XR traffic. The first stream 1102 and the second stream 1104 include packets (depicted as rectangles in the diagram 1100) that are carried on PDSCHs. In an example, the first stream 1102 may carry packets containing video data and the second stream 1104 may carry packets containing audio data. Packets in the first stream 1102 may be associated with a first periodicity (e.g., 16.67 ms) and packets in the second stream 1104 may be associated with a second periodicity (e.g., 10 ms). The diagram 1100 also depicts a combined/colliding stream 1106 that may be a combination of the first stream 1102 and the second stream 1104. As an example, the DCI may include an index for a table, such as a table described in connection with FIG., 6, 7, or 8, or a pattern such as in FIG. 9, which the UE may apply instead of a previously configured linkage.

A UE may receive a DCI 1108 that indicates a rule. The rule may indicate that PDSCHs that carry packets in a time and order associated with the first stream 1102 are to use MCS 8 and FDRA 1. The rule may further indicate that PDSCHs that carry packets in a time and order associated with the second stream 1104 are to use MCS 5 and FDRA 2. The rule may also indicate that PDSCHs that carry packets in a time and order associated with the combined/colliding stream 1106 are to use MCS 12 and FDRA 3.

In some aspects, the DCI 1108 may include override value(s) for parameter(s) of PDSCH(s)/PUSCH(s). When the DCI 1108 includes the override value(s) the UE may apply the override value(s) to the parameter(s) of the PDSCH(s)/PUSCH(s) instead of values of the rule. In some aspects, the override value(s) may be delta values.

In an example, FIG. 12 at 1210F shows the UE 1202 receiving a DCI to be used with a rule (or rules). At 1212, the UE 1202 applies values to parameters of PDSCH(s)/PUSCH(s) based upon the DCI and the rule(s) received at 1206F. At 1214, the UE 1202 may transmit data on a PUSCH (or PUSCHs) having parameters with the values. At 1216, the UE 1202 may receive data on a PDSCH (or PDSCHs) having parameters with the values.

Figure 13:
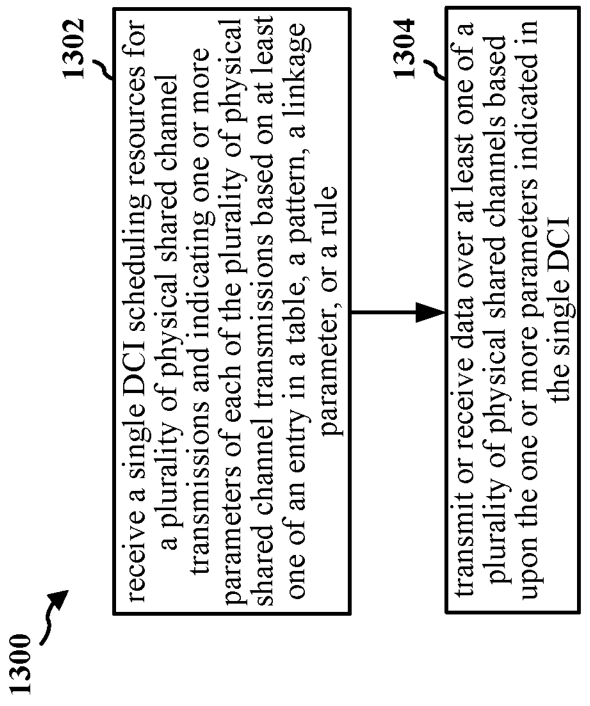
FIG. 13 is a flowchart of a method of wireless communication.

FIG. 13 is a flowchart 1300 of a method of wireless communication. The method may be performed by a UE (e.g., the UE 104, 350, 1202; the apparatus 1704). In an example, the method may be performed by the PDSCH/PUSCH configuration component 198. The method may be associated with various advantages for the UE, such as reduced signaling overhead at the UE, as the DCI may not explicitly include values for each of the parameters.

At 1302, the UE receives a single DCI scheduling resources for a plurality of physical shared channel transmissions and indicating one or more parameters of each of the plurality of physical shared channel transmissions based on at least one of an entry in a table, a pattern, a linkage parameter, or a rule. For example, FIG. 12 at 1210 shows the UE 1202 receiving a DCI, where the DCI may indicate parameter(s) of PDSCH or PUSCH transmission based on an entry in a table, a pattern, a linkage parameter, or a rule. In another example, the DCI may be the DCI 502, the DCI 606, the DCI 704, the DCI 804, the DCI 902, the DCI 1004, or the DCI 1108 of FIGS. 5-11, respectively. In yet another example, the table may be the first RRC configured table 602, the second RRC configured table 604, the RRC configured table 702, or the RRC configured table 802.

At 1304, the UE transmits or receives data over at least one of a plurality of physical shared channels based upon the one or more parameters indicated in the single DCI. For example, FIG. 12 at 1214 shows the UE 1202 transmitting data on a PUSCH transmission with applied parameter values. In another example, FIG. 12 at 1216 shows the UE 1202 receiving data on a PDSCH transmission with applied parameter values.

Figure 14:
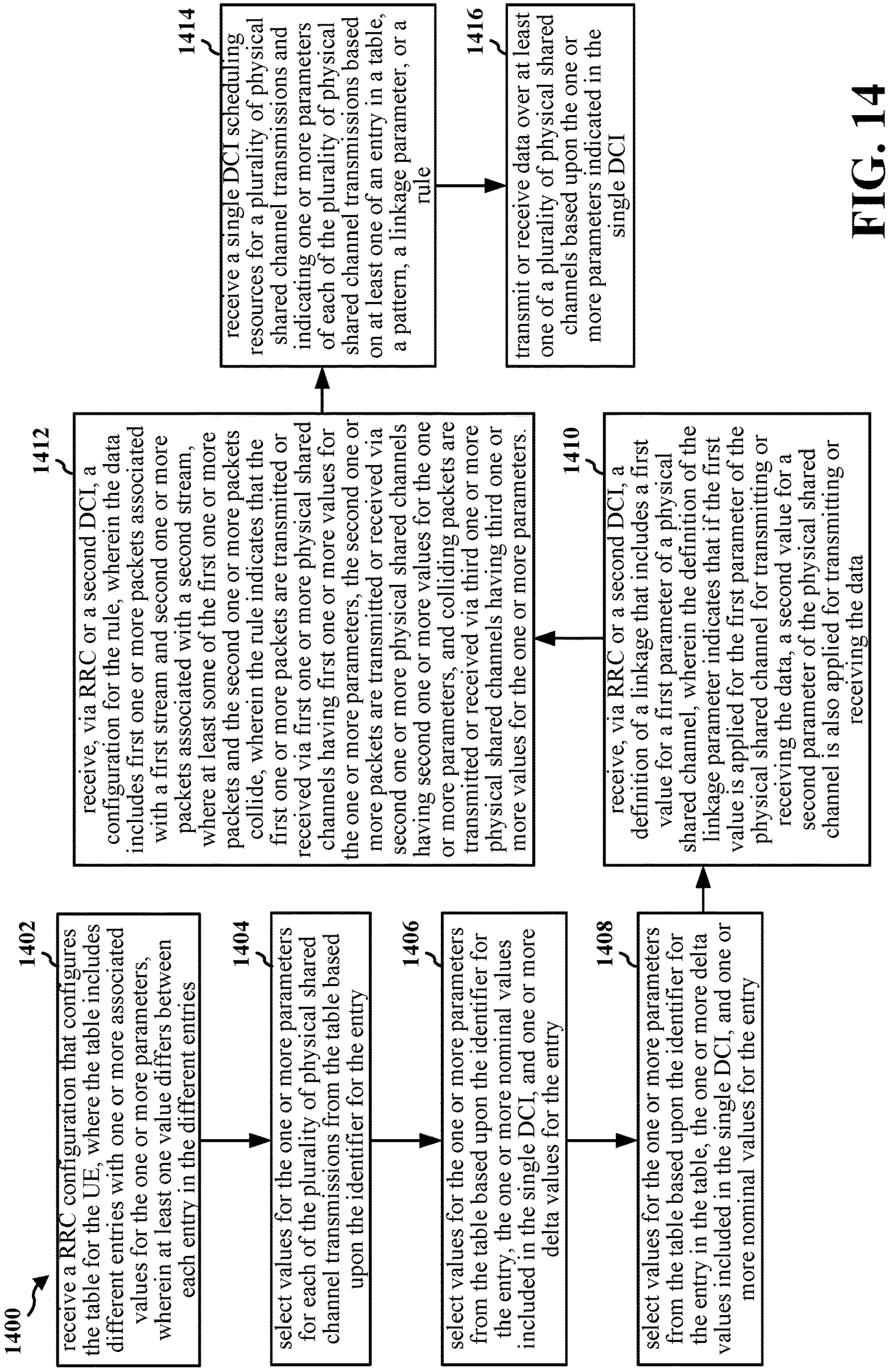
FIG. 14 is a flowchart of a method of wireless communication.

FIG. 14 is a flowchart 1400 of a method of wireless communication. The method may be performed by a UE (e.g., the UE 104, 350, 1202; the apparatus 1704). In an example, the method (including the various configurations described below) may be performed by the PDSCH/PUSCH configuration component 198. The method may provide various advantages for the UE, such as reduced signaling overhead at the UE, as the single DCI received by the UE may not explicitly include values for parameters of PDSCH/PUSCH transmissions.

At 1414, the UE receives a single DCI scheduling resources for a plurality of physical shared channel transmissions and indicating one or more parameters of each of the plurality of physical shared channel transmissions based on at least one of an entry in a table, a pattern, a linkage parameter, or a rule. For example, FIG. 12 at 1210 shows the UE 1202 receiving a DCI, where the DCI may indicate parameter(s) of PDSCH or PUSCH transmission based on an entry in a table, a pattern, a linkage parameter, or a rule. In another example, the DCI may be the DCI 502, the DCI 606, the DCI 704, the DCI 804, the DCI 902, the DCI 1004, or the DCI 1108 of FIGS. 5-11, respectively. In yet another example, the table may be the first RRC configured table 602, the second RRC configured table 604, the RRC configured table 702, or the RRC configured table 802.

At 1416, the UE transmits or receives data over at least one of a plurality of physical shared channels based upon the one or more parameters indicated in the single DCI. For example, FIG. 12 at 1214 shows the UE 1202 transmitting data on a PUSCH transmission with applied parameter values. In another example, FIG. 12 at 1216 shows the UE 1202 receiving data on a PDSCH transmission with applied parameter values.

In one aspect, the plurality of physical shared channel transmissions includes at least one of one or more PDSCH transmissions or one or more PUSCH transmissions. For example, FIG. 12 at 1216 illustrates a PDSCH transmission and FIG. 12 at 1214 illustrates a PUS CH transmission.

In one aspect, the one or more parameters may include at least one: TDRA, a FDRA, a MCS, a TCI state, or spatial relation information. For example, referring to FIG. 5, the first parameters 504 and the Nth parameters 508 may include TDRA, a FDRA, a MCS, a TCI state, or spatial relation information.

In one aspect, the data may be transmitted or received over a first physical shared channel and a second physical shared channel in the plurality of physical shared channels, where the first physical shared channel may have first one or more values for the one or more parameters based upon the single DCI, where the second physical shared channel may have second one or more values for the one or more parameters based upon the single DCI, where the first one or more values may differ at least in part from the second one or more values. For example, referring to FIG. 5, the first parameters for the first PDSCH/PUSCH 506 may have different values than values for the Nth parameters 508 of the Nth PDSCH/PUSCH 510.

In one aspect, the data may be associated with XR traffic. For example, referring to FIG. 4, the data may be associated with the first XR flow 402 and/or the second XR flow 408.

In one aspect, at 1402, the UE may receive a RRC configuration that configures the table for the UE, wherein the table may include different entries with one or more associated values for the one or more parameters, where at least one value differs between each entry in the different entries. For example, FIG. 12 at 1206A shows the UE 1202 receiving a RRC table configuration. Referring to FIG. 6, the table may be the first RRC configured table 602 or the second RRC configured table 604.

In one aspect, at 1404, the single DCI may include an identifier for the entry in the table and the UE may select values for the one or more parameters for each of the plurality of physical shared channel transmissions from the table based upon the identifier for the entry, where transmit or receive the data over the at least one of the plurality of physical shared channels may be based upon the values for the one or more parameters. For example, FIG. 12 at 1210A shows the UE 1202 receiving a DCI that indicates an entry in a table. In another example, the DCI may be the DCI 606 in FIG. 6. The UE may select values for parameters for physical shared channel transmissions from the first RRC configured table 602 or the second RRC configured table 604 based on the DCI 606. As the DCI 606 may not explicitly include values for each of the parameters, the DCI 606 may be associated with reduced signaling overhead at the UE.

In one aspect, the table may include a first entry associated with a first number of physical shared channels and a second entry associated with a second number of physical shared channels, where the first number may be different than the second number. For example, referring to FIG. 6, entry 0 in the first RRC configured table 602 may be associated with PDSCH 1-4 and entry 1 in the first RRC configured table 602 may be associated with the PDSCH 1-5.

In one aspect, at 1406, the one or more associated values for the one or more parameters may include delta values, the single DCI may include an identifier for the entry in the table and one or more nominal values, and the UE may select values for the one or more parameters from the table based upon the identifier for the entry, the one or more nominal values included in the single DCI, and one or more delta values for the entry, where transmit or receive the data over the at least one of the plurality of physical shared channels may be based upon the values. For example, FIG. 12 at 1206B shows the UE 1202 receiving an RRC table configuration with delta values. In another example, FIG. 12 at 1210B shows the UE 1202 receiving a DCI that includes a table entry and a nominal value. In yet another example, the DCI may be the DCI 704 and the table may be the RRC configured table 702 illustrated in FIG. 7. In a further example, referring to FIG. 12, the data transmitted at 1214 and/or the data received at 1216 may be based upon values from the RRC configured table 702, where the UE 1202 may select the values based on the DCI 704. As the DCI 704 may not explicitly include values for parameters, the DCI 704 may be associated with reduced signaling overhead at the UE.

In one aspect, at 1408, the one or more associated values for the one or more parameters may include nominal values, the single DCI may include an identifier for the entry in the table and one or more delta values, and the UE may select values for the one or more parameters from the table based upon the identifier for the entry in the table, the one or more delta values included in the single DCI, and one or more nominal values for the entry, where transmit or receive the data over the at least one of the plurality of physical shared channels may be based upon the values. For example, FIG. 12 at 1206C shows the UE 1202 receiving an RRC table configuration with nominal values. In another example, FIG. 12 at 1210C shows the UE 1202 receiving a DCI that includes a table entry and a delta value. In yet another example, the DCI may be the DCI 804 and the table may be the RRC configured table 802 illustrated in FIG. 8. In a further example, referring to FIG. 12, the data transmitted at 1214 and/or the data received at 1216 may be based upon values from the RRC configured table 802, where the UE 1202 may select the values based on the DCI 804. As the DCI 804 may not explicitly include values for parameters, the DCI 804 may be associated with reduced signaling overhead at the UE.

In one aspect, the data may include first one or more packets associated with a first stream and second one or more packets associated with a second stream, where the pattern may indicate that the first stream may be transmitted or received via first one or more physical shared channels having first one or more values for the one or more parameters, where the pattern may indicate that the second stream is transmitted or received via second one or more physical shared channels having second one or more values for the one or more parameters. For example, referring to FIG. 9, the DCI may be the DCI 902. The first stream may be the I-stream and the second stream may be the P-stream illustrated in FIG. 9. In a further example, FIG. 12 at 1210D shows the UE 1202 receiving a DCI that indicates a pattern. In yet another example, the data transmitted at 1214 and/or the data received at 1216 may be based upon the pattern. The DCI 902 may be associated with reduced signaling overhead for data that is transmitted or received in multiple streams.

In one aspect, at 1410, the UE may receive, via RRC or a second DCI, a definition of a linkage that includes a first value for a first parameter of a physical shared channel, where the definition of the linkage parameter may indicate that if the first value is applied for the first parameter of the physical shared channel for transmit or receive the data, a second value for a second parameter of the physical shared channel may also be applied for transmit or receive the data. For example, FIG. 12 at 1206E shows the UE 1202 receiving a definition of a parameter linkage. In another example, FIG. 10 illustrates configured linkages 1002 and a DCI 1004. In a further example, referring to FIG. 12, the data transmitted at 1214 and/or the data received at 1216 may be based upon the DCI 1004 and the configured linkages 1002. The configured linkages 1002 may reduce an amount of information in the DCI 1004, thus reducing signaling overhead.

In one aspect, the single DCI may further indicate that the definition of the linkage parameter may be overridden and that a third value for the second parameter of the physical shared channel may be applied for transmit or receive the data. In an example, FIG. 10 illustrates override value(s) 1006 included in the DCI 1004. In a further example, referring to FIG. 12, the data transmitted at 1214 and/or the data received at 1216 may be based upon the override value(s) 1006 included in the DCI 1004.

In one aspect, at 1412, the UE may receive, via RRC or a second DCI, a configuration for the rule, where the data may include first one or more packets associated with a first stream and second one or more packets associated with a second stream, where at least some of the first one or more packets and the second one or more packets may collide, where the rule may indicate that the first one or more packets may be transmitted or received via first one or more physical shared channels having first one or more values for the one or more parameters, the second one or more packets may be transmitted or received via second one or more physical shared channels having second one or more values for the one or more parameters, and colliding packets may be transmitted or received via third one or more physical shared channels having third one or more values for the one or more parameters. For example, FIG. 12 at 1206F shows the UE 1202 receiving one or more rules via a second DCI or RRC. In a further example, FIG. 12 at 1210F shows the UE 1202 receiving a DCI that is to be used with the one or more rules. In another example, FIG. 11 illustrates a first stream 1102, a second stream 1104, and a combined/colliding stream 1106. FIG. 11 also illustrates a DCI 1108 indicating rule(s). In an example, the DCI 1108 indicates MCS and FDRA values for packets in the first stream 1102, the second stream 1104, and the combined/colliding stream 1106. In a further example, referring to FIG. 12, the data transmitted at 1214 and/or the data received at 1216 may be based upon the DCI 1108. The DCI 1108 may reduce signaling overhead for multiple and/or colliding streams.

In one aspect, the single DCI may further indicate that the rule may be overridden and that fourth one or more values may be applied in place of at least one of the first one or more values, the second one or more values, or the third one or more values for transmit or receive the data. For example, referring to FIG. 11, the DCI 1108 may include override/delta values. In a further example, referring to FIG. 12, the data transmitted at 1214 and/or the data received at 1216 may be based upon the override/delta values included in the DCI 1108.

Figure 15:
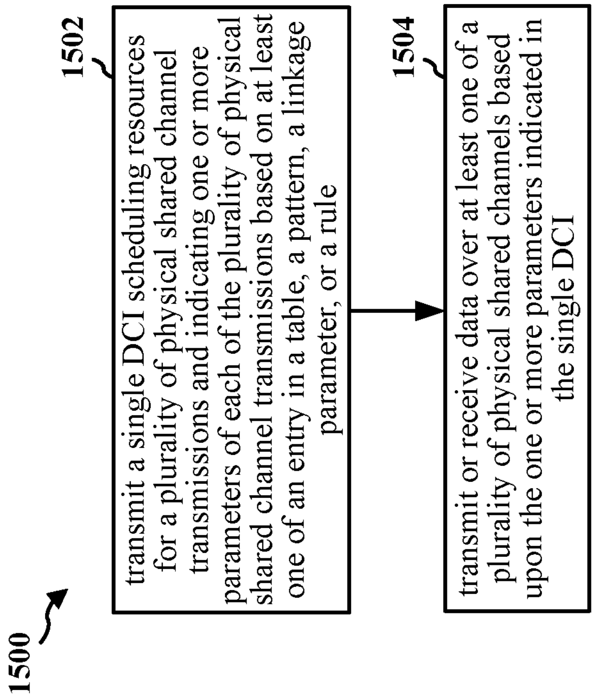
FIG. 15 is a flowchart of a method of wireless communication.

FIG. 15 is a flowchart 1500 of a method of wireless communication. The method may be performed by a network node (e.g., the base station 102, 310, 1204; the CU 110; the DU 130; the RU 140; the network entity 1702). In an example, the method may be performed by the PDSCH/PUSCH configuration component 199. The method may be associated with various advantages for the network node, such as reduced signaling overhead at the network node, as the single DCI transmitted by the network node may not explicitly include values for parameters of PDSCH/PUSCH transmissions.

At 1502, the network node transmits a single DCI scheduling resources for a plurality of physical shared channel transmissions and indicating one or more parameters of each of the plurality of physical shared channel transmissions based on at least one of an entry in a table, a pattern, a linkage parameter, or a rule. For example, FIG. 12 at 1210 shows the base station 1204 transmitting a DCI, where the DCI may indicate parameter(s) of PDSCH or PUSCH transmission based on an entry in a table, a pattern, a linkage parameter, or a rule. In another example, the DCI may be the DCI 502, the DCI 606, the DCI 704, the DCI 804, the DCI 902, the DCI 1004, or the DCI 1108 of FIGS. 5-11, respectively. In yet another example, the table may be the first RRC configured table 602, the second RRC configured table 604, the RRC configured table 702, or the RRC configured table 802.

At 1504, the network node transmits or receives data over at least one of a plurality of physical shared channels based upon the one or more parameters indicated in the single DCI. For example, FIG. 12 at 1214 shows the base station 1204 receiving data on a PUSCH transmission with applied parameter values. In another example, FIG. 12 at 1216 shows the base station 1204 transmitting data on a PDSCH transmission with applied parameter values.

Figure 16:
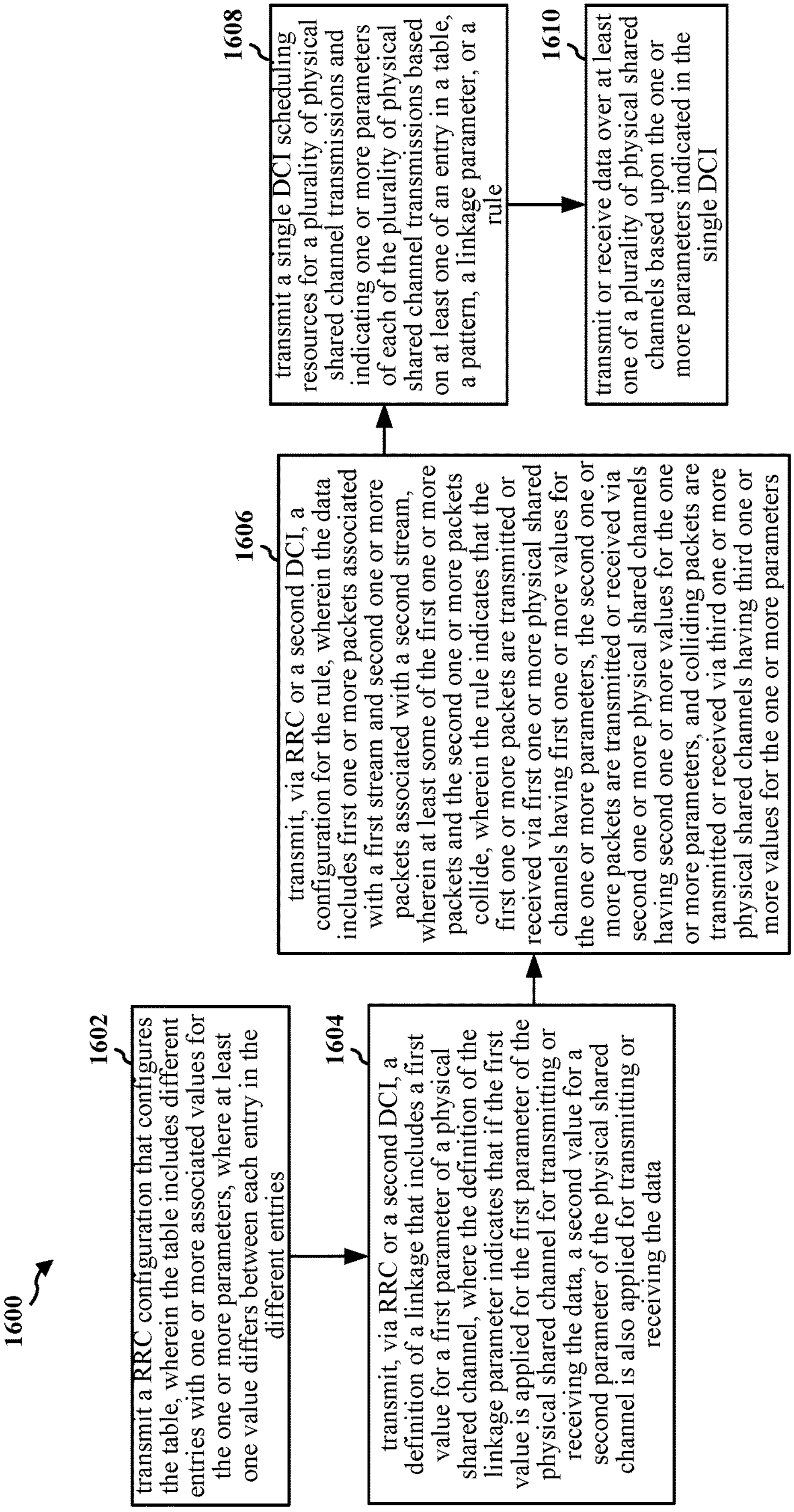
FIG. 16 is a flowchart of a method of wireless communication.

FIG. 16 is a flowchart 1600 of a method of wireless communication. The method may be performed by a network node (e.g., the base station 102, 310, 1204; the network entity 1702). In an example, the method (including the various configurations described below) may be performed by the PDSCH/PUSCH configuration component 199. The method may provide various advantages for the network node, such as reduced signaling overhead at the network node, as the single DCI transmitted by the network node may not explicitly include values for parameters of PDSCH/PUSCH transmissions.

At 1608, the network node transmits a single DCI scheduling resources for a plurality of physical shared channel transmissions and indicating one or more parameters of each of the plurality of physical shared channel transmissions based on at least one of an entry in a table, a pattern, a linkage parameter, or a rule. For example, FIG. 12 at 1210 shows the base station 1204 transmitting a DCI, where the DCI may indicate parameter(s) of PDSCH or PUSCH transmission based on an entry in a table, a pattern, a linkage parameter, or a rule. In another example, the DCI may be the DCI 502, the DCI 606, the DCI 704, the DCI 804, the DCI 902, the DCI 1004, or the DCI 1108 of FIGS. 5-11, respectively. In yet another example, the table may be the first RRC configured table 602, the second RRC configured table 604, the RRC configured table 702, or the RRC configured table 802.

At 1610, the network node transmits or receives data over at least one of a plurality of physical shared channels based upon the one or more parameters indicated in the single DCI. For example, FIG. 12 at 1214 shows the base station 1204 receiving data on a PUSCH transmission with applied parameter values. In another example, FIG. 12 at 1216 shows the base station 1204 transmitting data on a PDSCH transmission with applied parameter values.

In one aspect, the plurality of physical shared channel transmissions includes at least one of one or more PDSCH transmissions or one or more PUSCH transmissions. For example, FIG. 12 at 1216 illustrates a PDSCH transmission and FIG. 12 at 1214 illustrates a PUSCH transmission.

In one aspect, the one or more parameters may include at least one: TDRA, a FDRA, a MCS, a TCI state, or spatial relation information. For example, referring to FIG. 5, the first parameters 504 and the Nth parameters 508 may include TDRA, a FDRA, a MCS, a TCI state, or spatial relation information.

In one aspect, the data may be transmitted or received over a first physical shared channel and a second physical shared channel in the plurality of physical shared channels, where the first physical shared channel may have first one or more values for the one or more parameters based upon the single DCI, where the second physical shared channel may have second one or more values for the one or more parameters based upon the single DCI, where the first one or more values may differ at least in part from the second one or more values. For example, referring to FIG. 5, the first parameters for the first PDSCH/PUSCH 506 may have different values than values for the Nth parameters 508 of the Nth PDSCH/PUSCH 510.

In one aspect, the data may be associated with XR traffic. For example, referring to FIG. 4, the data may be associated with the first XR flow 402 and/or the second XR flow 408.

In one aspect, at 1602, the network node may transmit a RRC configuration that configures the table, where the table includes different entries with one or more associated values for the one or more parameters, where at least one value differs between each entry in the different entries. For example, FIG. 12 at 1206A shows the base station 1204 transmitting a RRC table configuration. Referring to FIG. 6, the table may be the first RRC configured table 602 or the second RRC configured table 604.

In one aspect, the single DCI may include an identifier for the entry in the table, where transmit or receive the data over the at least one of the plurality of physical shared channels may be based upon the identifier for the entry in the table and values for the one or more parameters in the table. For example, FIG. 12 at 1210A shows the base station 1204 transmitting a DCI that indicates an entry in a table. In another example, the DCI may be the DCI 606 in FIG. 6. Values for parameters for physical shared channel transmissions may be selected from the first RRC configured table 602 or the second RRC configured table 604 based on the DCI 606. As the DCI 606 may not explicitly include values for each of the parameters, the DCI 606 may be associated with reduced signaling overhead at the network node.

In one aspect, the table may include a first entry associated with a first number of physical shared channels and a second entry associated with a second number of physical shared channels, where the first number may be different than the second number. For example, referring to FIG. 6, entry 0 in the first RRC configured table 602 may be associated with PDSCH 1-4 and entry 1 in the first RRC configured table 602 may be associated with the PDSCH 1-5.

In one aspect, the one or more associated values for the one or more parameters may comprise delta values, where the single DCI may include an identifier for the entry in the table and one or more nominal values, where transmit or receive the data over the at least one of the plurality of physical shared channels may be based upon the identifier for the entry in the table, the one or more nominal values, and the delta values in the table. For example, FIG. 12 at 1206B shows the base station 1204 transmitting an RRC table configuration with delta values. In another example, FIG. 12 at 1210B shows the base station 1204 transmitting a DCI that includes a table entry and a nominal value. In yet another example, the DCI may be the DCI 704 and the table may be the RRC configured table 702 illustrated in FIG. 7. In a further example, referring to FIG. 12, the data transmitted at 1214 and/or the data received at 1216 may be based upon values from the RRC configured table 702, where the values may be selected based on the DCI 704. As the DCI 704 may not explicitly include values for parameters, the DCI 704 may be associated with reduced signaling overhead at the network node.

In one aspect, the one or more associated values for the one or more parameters may comprise nominal values, where the single DCI may include an identifier for the entry in the table and one or more delta values, where transmit or receive the data over the at least one of the plurality of physical shared channels may be based upon the identifier for the entry in the table, the one or more delta values, and the nominal values in the table. For example, FIG. 12 at 1206C shows the base station 1204 transmitting an RRC table configuration with nominal values. In another example, FIG. 12 at 1210C shows the base station 1204 transmitting a DCI that includes a table entry and a delta value. In yet another example, the DCI may be the DCI 804 and the table may be the RRC configured table 802 illustrated in FIG. 8. In a further example, referring to FIG. 12, the data transmitted at 1214 and/or the data received at 1216 may be based upon values from the RRC configured table 802, where the values may be selected based on the DCI 804. As the DCI 804 may not explicitly include values for parameters, the DCI 804 may be associated with reduced signaling overhead at the network node.

In one aspect, the data may include first one or more packets associated with a first stream and second one or more packets associated with a second stream, where the pattern may indicate that the first stream may be transmitted or received via first one or more physical shared channels having first one or more values for the one or more parameters, where the pattern may indicate that the second stream is transmitted or received via second one or more physical shared channels having second one or more values for the one or more parameters. For example, referring to FIG. 9, the DCI may be the DCI 902. The first stream may be the I-stream and the second stream may be the P-stream illustrated in FIG. 9. In a further example, FIG. 12 at 1210D shows the base station 1204 transmitting a DCI that indicates a pattern. In yet another example, the data transmitted at 1214 and/or the data received at 1216 may be based upon the pattern. The DCI 902 may be associated with reduced signaling overhead for data that is transmitted or received in multiple streams.

In one aspect, at 1604, network node may transmit, via RRC or a second DCI, a definition of a linkage that includes a first value for a first parameter of a physical shared channel, where the definition of the linkage parameter may indicate that if the first value is applied for the first parameter of the physical shared channel for transmit or receive the data, a second value for a second parameter of the physical shared channel may also be applied for transmit or receive the data. For example, FIG. 12 at 1206E shows the base station 1204 transmitting a definition of a parameter linkage. In another example, FIG. 10 illustrates configured linkages 1002 and a DCI 1004. In a further example, referring to FIG. 12, the data transmitted at 1214 and/or the data received at 1216 may be based upon the DCI 1004 and the configured linkages 1002. The configured linkages 1002 may reduce an amount of information in the DCI 1004, thus reducing signaling overhead.

In one aspect, the single DCI may further indicate that the definition of the linkage parameter may be overridden and that a third value for the second parameter of the physical shared channel may be applied for transmit or receive the data. In an example, FIG. 10 illustrates override value(s) 1006 included in the DCI 1004. In a further example, referring to FIG. 12, the data transmitted at 1214 and/or the data received at 1216 may be based upon the override value(s) 1006 included in the DCI 1004.

In one aspect, at 1606, the network node may transmit, via RRC or a second DCI, a configuration for the rule, where the data may include first one or more packets associated with a first stream and second one or more packets associated with a second stream, where at least some of the first one or more packets and the second one or more packets may collide, where the rule may indicate that the first one or more packets may be transmitted or received via first one or more physical shared channels having first one or more values for the one or more parameters, the second one or more packets may be transmitted or received via second one or more physical shared channels having second one or more values for the one or more parameters, and colliding packets may be transmitted or received via third one or more physical shared channels having third one or more values for the one or more parameters. For example, FIG. 12 at 1206F shows the base station 1204 transmitting one or more rules via a second DCI or RRC. In a further example, FIG. 12 at 1210F shows the base station 1204 transmitting a DCI that is to be used with the one or more rules. In another example, FIG. 11 illustrates a first stream 1102, a second stream 1104, and a combined/colliding stream 1106. FIG. 11 also illustrates a DCI 1108 indicating rule(s). In an example, the DCI 1108 indicates MCS and FDRA values for packets in the first stream 1102, the second stream 1104, and the combined/colliding stream 1106. In a further example, referring to FIG. 12, the data transmitted at 1214 and/or the data received at 1216 may be based upon the DCI 1108.

In one aspect, the single DCI may further indicate that the rule may be overridden and that fourth one or more values may be applied in place of at least one of the first one or more values, the second one or more values, or the third one or more values for transmit or receive the data. For example, referring to FIG. 11, the DCI 1108 may include override/delta values. In a further example, referring to FIG. 12, the data transmitted at 1214 and/or the data received at 1216 may be based upon the override/delta values included in the DCI 1108. The DCI 1108 may reduce signaling overhead for multiple and/or colliding streams.

Figure 17:
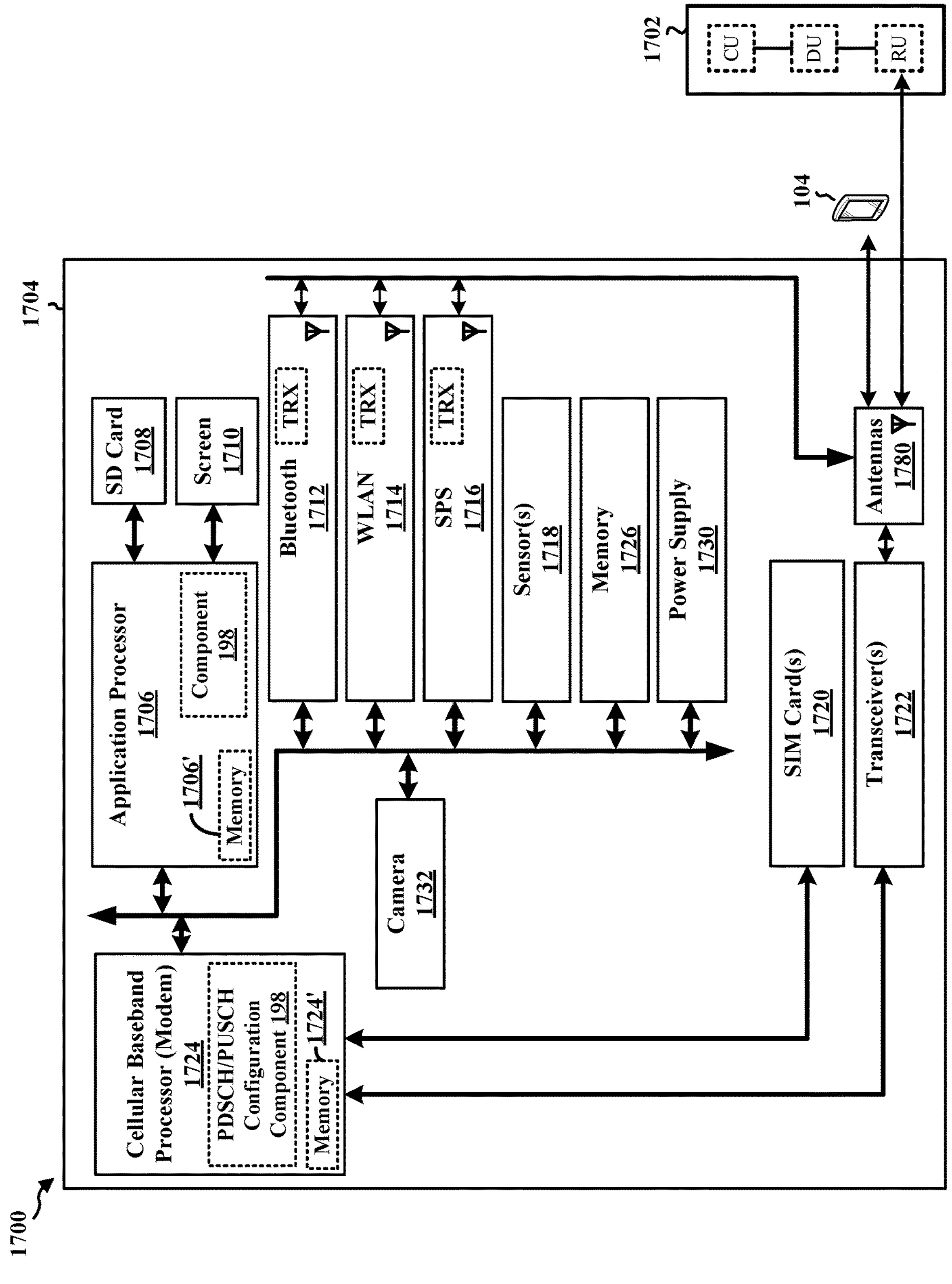
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include a cellular baseband processor 1724 (also referred to as a modem) coupled to one or more transceivers 1722 (e.g., cellular RF transceiver). The cellular baseband processor 1724 may include on-chip memory 1724'. In some aspects, the apparatus 1704 may further include one or more subscriber identity modules (SIM) cards 1720 and an application processor 1706 coupled to a secure digital (SD) card 1708 and a screen 1710. The application processor 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor 1724 communicates through the transceiver(s) 1722 via one or more antennas 1780 with the UE 104 and/or with an RU associated with a network entity 1702. The cellular baseband processor 1724 and the application processor 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor 1724 and the application processor 1706 are each responsible for general processing, including the execution of software stored on the computer-readable medium/memory. The software, when executed by the cellular baseband processor 1724/application processor 1706, causes the cellular baseband processor 1724/application processor 1706 to perform the various functions described supra. The computer-readable medium/memory may also be used for storing data that is manipulated by the cellular baseband processor 1724/application processor 1706 when executing software. The cellular baseband processor 1724/application processor 1706 may be a component of the UE 350 and may include the memory 360 and/or at least one of the TX processor 368, the RX processor 356, and the controller/processor 359. In one configuration, the apparatus 1704 may be a processor chip (modem and/or application) and include just the cellular baseband processor 1724 and/or the application processor 1706, and in another configuration, the apparatus 1704 may be the entire UE (e.g., see 350 of FIG. 3) and include the additional modules of the apparatus 1704.

As discussed supra, the PDSCH/PUSCH configuration component 198 is configured to receive a single DCI scheduling resources for a plurality of physical shared channel transmissions and indicating one or more parameters of each of the plurality of physical shared channel transmissions based on at least one of an entry in a table, a pattern, a linkage parameter, or a rule and transmit or receive data over at least one of a plurality of physical shared channels based upon the one or more parameters indicated in the single DCI. The PDSCH/PUSCH configuration component 198 may be further configured to perform any of the aspects described in connection with FIGS. 5-11 and/or performed by the UE in FIG. 12. The PDSCH/PUSCH configuration component 198 may be within the cellular baseband processor 1724, the application processor 1706, or both the cellular baseband processor 1724 and the application processor 1706. The PDSCH/PUSCH configuration component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1704 may include a variety of components configured for various functions. In one configuration, the apparatus 1704, and in particular the cellular baseband processor 1724 and/or the application processor 1706, includes means for receiving a single downlink control information (DCI) scheduling resources for a plurality of physical shared channel transmissions and indicating one or more parameters of each of the plurality of physical shared channel transmissions based on at least one of an entry in a table, a pattern, a linkage parameter, or a rule and means for transmitting or receiving data over at least one of a plurality of physical shared channels based upon the one or more parameters indicated in the single DCI. The PDSCH/PUSCH configuration component 198 may be further configured with means to perform any of the aspects described in connection with FIGS. 5-11 and/or performed by the UE in FIG. 12. The means may be the PDSCH/PUSCH configuration component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Figure 18:
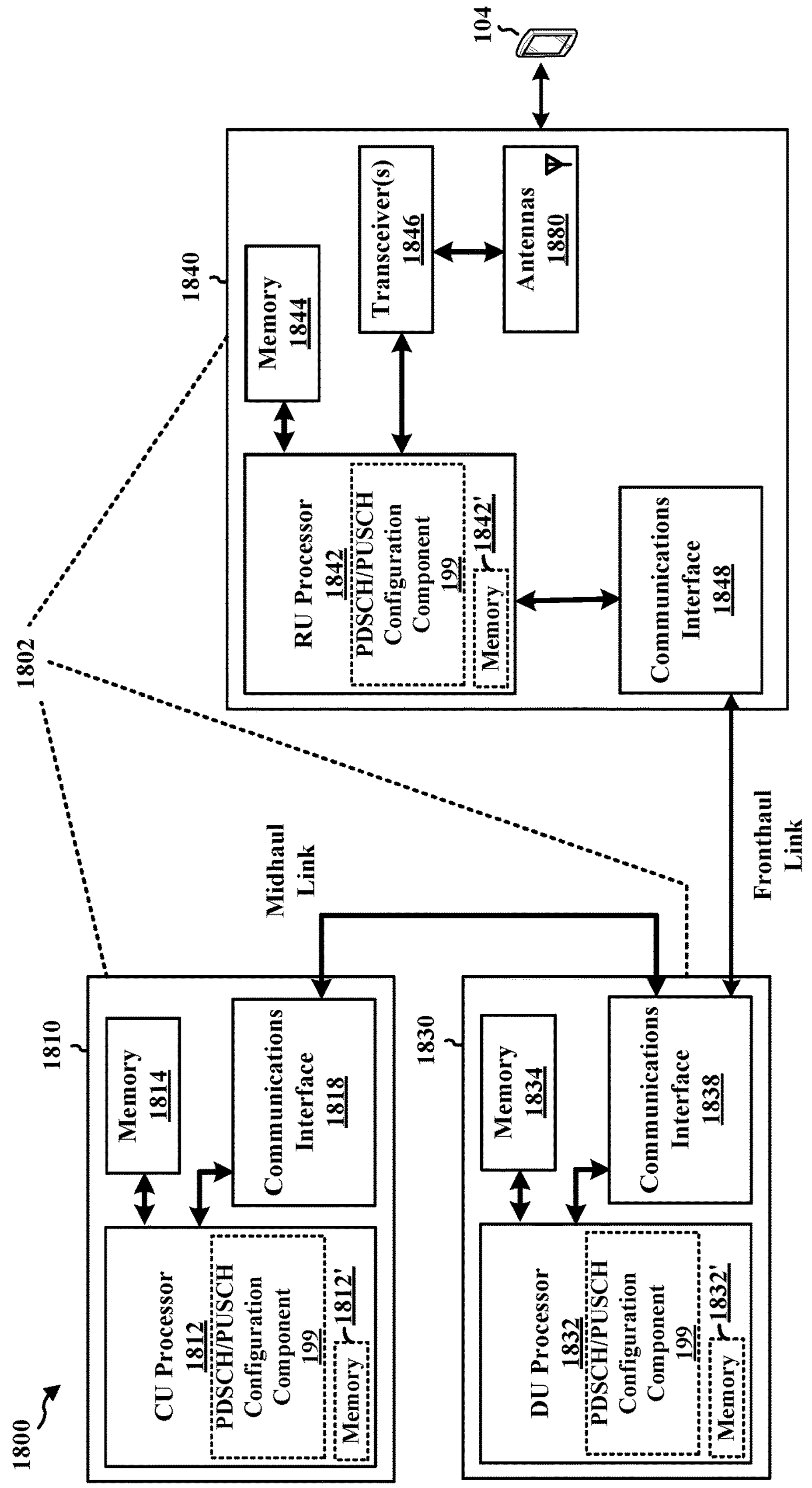
FIG. 18 is a diagram illustrating an example of a hardware implementation for an example network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the PDSCH/PUSCH configuration component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include a CU processor 1812. The CU processor 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include a DU processor 1832. The DU processor 1832 may include on-chip memory 1832'. In some aspects, the DU 1830 may further include additional memory modules 1834 and a communications interface 1838. The DU 1830 communicates with the RU 1840 through a fronthaul link. The RU 1840 may include an RU processor 1842. The RU processor 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the PDSCH/PUSCH configuration component 199 is configured to transmit a single DCI scheduling resources for a plurality of physical shared channel transmissions and indicating one or more parameters of each of the plurality of physical shared channel transmissions based on at least one of an entry in a table, a pattern, a linkage parameter, or a rule and transmit or receive data over at least one of a plurality of physical shared channels based upon the one or more parameters indicated in the single DCI. The PDSCH/PUSCH configuration component 199 may be further configured to perform any of the aspects described in connection with FIGS. 5-11 and/or performed by the base station in FIG. 12. The PDSCH/PUSCH configuration component 199 may be within one or more processors of one or more of the CU 1810, DU 1830, and the RU 1840. The PDSCH/PUSCH configuration component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1802 may include a variety of components configured for various functions. In one configuration, the network entity 1802 includes means for transmitting a single DCI scheduling resources for a plurality of physical shared channel transmissions and indicating one or more parameters of each of the plurality of physical shared channel transmissions based on at least one of an entry in a table, a pattern, a linkage parameter, or a rule and means for transmitting or receiving data over at least one of a plurality of physical shared channels based upon the one or more parameters indicated in the single DCI. The PDSCH/PUSCH configuration component 199 may be further configured with means to perform any of the aspects described in connection with FIGS. 5-11 and/or performed by the base station in FIG. 12. The means may be the PDSCH/PUSCH configuration component 199 of the network entity 1802 configured to perform the functions recited by the means. As described supra, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means.

Some wireless communication systems may support a single DCI that includes multiple PDSCH/PUSCH grants, where values for parameters for each PDSCH/PUSCH are the same (e.g., a single type of MCS and a single type of FDRA for each PDSCH/PUSCH). Utilizing the same values for parameters for multiple PDSCHs/PUSCHs may be restrictive. For example, as noted above, XR traffic may have jitter, different numbers of packets, packets of different lengths, and/or may arrive in non-integer cycles. In an example, if multiple PDSCHs share the same MCS/RB, a DCI granting the multiple PDSCHs may be dimensioned over a maximum packet size (which may be referred to as "over-dimensioning"), which may lead to time and/or frequency resources being underutilized. In some configurations, a wireless communication system may support a single DCI that includes multiple PDSCH/PUSCH grants, where values of parameters for each of the PDSCHs/PUSCHs may vary. However, explicitly indicating the values of the parameters in a DCI for each of the PDSCHs/PUSCHs may be associated with increased signaling overhead.

Various aspects described herein relate to techniques to reduce signaling overhead of a DCI that specifies parameters of multiple PDSCHs/PUSCHs, where some or all of the values of the parameters may vary between the multiple PDSCHs/PUSCHs. In some aspects, the DCI indicates an entry in a table, a pattern, a linkage parameter, or a rule. The aforementioned DCI may reduce signaling overhead, as the DCI may not explicitly include values for each of the parameters.

In an example, a UE receives a single DCI scheduling resources for a plurality of physical shared channel transmissions and indicating one or more parameters of each of the plurality of physical shared channel transmissions based on at least one of an entry in a table, a pattern, a linkage parameter, or a rule. The UE transmits or receives data over at least one of a plurality of physical shared channels based upon the one or more parameters indicated in the single DCI. As the single DCI may not explicitly include values for parameters for the plurality of physical shared channel transmissions (e.g., PDSCH or PUSCH transmissions) vis-à-vis the entry in the table, the pattern, the linkage parameter, or the rule, signaling overhead may be reduced.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: receiving a single downlink control information (DCI) scheduling resources for a plurality of physical shared channel transmissions and indicating one or more parameters of each of the plurality of physical shared channel transmissions based on at least one of an entry in a table, a pattern, a linkage parameter, or a rule and transmitting or receiving data over at least one of a plurality of physical shared channels based upon the one or more parameters indicated in the single DCI.

Aspect 2 is the method of aspect 1, where the plurality of physical shared channel transmissions includes at least one of one or more physical downlink shared channel (PDSCH) transmissions or one or more physical uplink shared channel (PUSCH) transmissions.

Aspect 3 is the method of any of aspects 1-2, where the one or more parameters include at least one: a time domain resource allocation (TDRA), a frequency domain resource allocation (FDRA), a modulation and coding scheme (MCS), a transmission configuration indication (TCI) state, or spatial relation information.

Aspect 4 is the method of any of aspects 1-3, where the data is transmitted or received over a first physical shared channel and a second physical shared channel in the plurality of physical shared channels, where the first physical shared channel has first one or more values for the one or more parameters based upon the single DCI, where the second physical shared channel has second one or more values for the one or more parameters based upon the single DCI, where the first one or more values differ at least in part from the second one or more values.

Aspect 5 is the method of any of aspects 1-4, where the data is associated with extended reality (XR) traffic.

Aspect 6 is the method of any of aspects 1-5, further including: receiving a radio resource control (RRC) configuration that configures the table for the UE, where the table includes different entries with one or more associated values for the one or more parameters, where at least one value differs between each entry in the different entries.

Aspect 7 is the method of aspect 6, where the single DCI includes an identifier for the entry in the table, further including: selecting values for the one or more parameters for each of the plurality of physical shared channel transmissions from the table based upon the identifier for the entry, where transmitting or receiving the data over the at least one of the plurality of physical shared channels is based upon the values for the one or more parameters.

Aspect 8 is the method of aspect 6, where the table includes a first entry associated with a first number of physical shared channels and a second entry associated with a second number of physical shared channels, where the first number is different than the second number.

Aspect 9 is the method of aspect 6, where the one or more associated values for the one or more parameters include delta values, where the single DCI includes an identifier for the entry in the table and one or more nominal values, further including: selecting values for the one or more parameters from the table based upon the identifier for the entry, the one or more nominal values included in the single DCI, and one or more delta values for the entry, where transmitting or receiving the data over the at least one of the plurality of physical shared channels is based upon the values.

Aspect 10 is the method of aspect 6, where the one or more associated values for the one or more parameters include nominal values, where the single DCI includes an identifier for the entry in the table and one or more delta values, further including: selecting values for the one or more parameters from the table based upon the identifier for the entry in the table, the one or more delta values included in the single DCI, and one or more nominal values for the entry, where transmitting or receiving the data over the at least one of the plurality of physical shared channels is based upon the values.

Aspect 11 is the method of any of aspects 1-5, where the data includes first one or more packets associated with a first stream and second one or more packets associated with a second stream, where the pattern indicates that the first stream is transmitted or received via first one or more physical shared channels having first one or more values for the one or more parameters, where the pattern indicates that the second stream is transmitted or received via second one or more physical shared channels having second one or more values for the one or more parameters.

Aspect 12 is the method of any of aspects 1-5, further including: receiving, via radio resource control (RRC) or a second DCI, a definition of a linkage that includes a first value for a first parameter of a physical shared channel, where the definition of the linkage parameter indicates that if the first value is applied for the first parameter of the physical shared channel for transmitting or receiving the data, a second value for a second parameter of the physical shared channel is also applied for transmitting or receiving the data.

Aspect 13 is the method of aspect 12, where the single DCI further indicates that the definition of the linkage parameter is overridden and that a third value for the second parameter of the physical shared channel is applied for transmitting or receiving the data.

Aspect 14 is the method of any of aspects 1-5, further including: receiving, via radio resource control (RRC) or a second DCI, a configuration for the rule, where the data includes first one or more packets associated with a first stream and second one or more packets associated with a second stream, where at least some of the first one or more packets and the second one or more packets collide, where the rule indicates that the first one or more packets are transmitted or received via first one or more physical shared channels having first one or more values for the one or more parameters, the second one or more packets are transmitted or received via second one or more physical shared channels having second one or more values for the one or more parameters, and colliding packets are transmitted or received via third one or more physical shared channels having third one or more values for the one or more parameters.

Aspect 15 is the method of aspect 14, where the single DCI further indicates that the rule is to be overridden and that fourth one or more values are applied in place of at least one of the first one or more values, the second one or more values, or the third one or more values for transmitting or receiving the data.

Aspect 16 is an apparatus for wireless communication at a user equipment (UE) including a memory and at least one processor coupled to the memory and based at least in part on information stored in the memory, the at least one processor is configured to perform a method in accordance with any of aspects 1-15.

Aspect 17 is an apparatus for wireless communications, including means for performing a method in accordance with any of aspects 1-15.

Aspect 18 is the apparatus of aspect 16 or 17 further including at least one of a transceiver or an antenna coupled to the at least one processor, wherein at least one of the transceiver or the antenna is configured to receive the single DCI and transmit or receive the data.

Aspect 19 is a non-transitory computer-readable medium including instructions that, when executed by an apparatus, cause the apparatus to perform a method in accordance with any of aspects 1-15.

Aspect 20 is a method of wireless communication at a network node, including: transmitting a single downlink control information (DCI) scheduling resources for a plurality of physical shared channel transmissions and indicating one or more parameters of each of the plurality of physical shared channel transmissions based on at least one of an entry in a table, a pattern, a linkage parameter, or a rule; and transmitting or receiving data over at least one of a plurality of physical shared channels based upon the one or more parameters indicated in the single DCI.

Aspect 21 is the method of aspect 20, where the plurality of physical shared channel transmissions includes at least one of one or more physical downlink shared channel (PDSCH) transmissions or one or more physical uplink shared channel (PUSCH) transmissions.

Aspect 22 is the method of any of aspects 20-21, where the one or more parameters include at least one: a time domain resource allocation (TDRA), a frequency domain resource allocation (FDRA), a modulation and coding scheme (MCS), a transmission configuration indication (TCI) state, or spatial relation information.

Aspect 23 is the method of any of aspects 20-22, where the data is transmitted or received over a first physical shared channel and a second physical shared channel in the plurality of physical shared channels, where the first physical shared channel has first one or more values for the one or more parameters based upon the single DCI, where the second physical shared channel has second one or more values for the one or more parameters based upon the single DCI, where the first one or more values differ at least in part from the second one or more values.

Aspect 24 is the method of any of aspects 20-23, where the data is associated with extended reality (XR) traffic.

Aspect 25 is the method of any of aspects 20-24, further including: transmitting a radio resource control (RRC) configuration that configures the table, where the table includes different entries with one or more associated values for the one or more parameters, where at least one value differs between each entry in the different entries.

Aspect 26 is the method of aspect 25, where the single DCI includes an identifier for the entry in the table, where transmitting or receiving the data over the at least one of the plurality of physical shared channels is based upon the identifier for the entry in the table and values for the one or more parameters in the table.

Aspect 27 is the method of aspect 25, where the table includes a first entry associated with a first number of physical shared channels and a second entry associated with a second number of physical shared channels, where the first number is different than the second number.

Aspect 28 is the method of aspect 25, where the one or more associated values for the one or more parameters include delta values, where the single DCI includes an identifier for the entry in the table and one or more nominal values, where transmitting or receiving the data over the at least one of the plurality of physical shared channels is based upon the identifier for the entry in the table, the one or more nominal values, and the delta values in the table.

Aspect 29 is the method of aspect 25, where the one or more associated values for the one or more parameters include nominal values, where the single DCI includes an identifier for the entry in the table and one or more delta values, where transmitting or receiving the data over the at least one of the plurality of physical shared channels is based upon the identifier for the entry in the table, the one or more delta values, and the nominal values in the table.

Aspect 30 is the method of any of aspects 20-24, where the data includes first one or more packets associated with a first stream and second one or more packets associated with a second stream, where the pattern indicates that the first stream is transmitted or received via first one or more physical shared channels having first one or more values for the one or more parameters, where the pattern indicates that the second stream is transmitted or received via second one or more physical shared channels having second one or more values for the one or more parameters.

Aspect 31 is the method of any of aspects 20-24, further including: transmitting, via radio resource control (RRC) or a second DCI, a definition of a linkage that includes a first value for a first parameter of a physical shared channel, where the definition of the linkage parameter indicates that if the first value is applied for the first parameter of the physical shared channel for transmitting or receiving the data, a second value for a second parameter of the physical shared channel is also applied for transmitting or receiving the data.

Aspect 32 is the method of aspect 31, where the single DCI further indicates that the definition of the linkage parameter is overridden and that a third value for the second parameter of the physical shared channel is applied for transmitting or receiving the data.

Aspect 33 is the method of any of aspects 20-24, further including: transmitting, via radio resource control (RRC) or a second DCI, a configuration for the rule, where the data includes first one or more packets associated with a first stream and second one or more packets associated with a second stream, where at least some of the first one or more packets and the second one or more packets collide, where the rule indicates that the first one or more packets are transmitted or received via first one or more physical shared channels having first one or more values for the one or more parameters, the second one or more packets are transmitted or received via second one or more physical shared channels having second one or more values for the one or more parameters, and colliding packets are transmitted or received via third one or more physical shared channels having third one or more values for the one or more parameters.

Aspect 34 is the method of aspect 33, where the single DCI further indicates that the rule is to be overridden and that fourth one or more values are applied in place of at least one of the first one or more values, the second one or more values, or the third one or more values for transmitting or receiving the data.

Aspect 35 is an apparatus for wireless communication at a network node including a memory and at least one processor coupled to the memory and based at least in part on information stored in the memory, the at least one processor is configured to perform a method in accordance with any of aspects 20-34.

Aspect 36 is an apparatus for wireless communications, including means for performing a method in accordance with any of aspects 20-34.

Aspect 37 is the apparatus of aspect 35 or 36 further including at least one of a transceiver or an antenna coupled to the at least one processor, wherein at least one of the transceiver or the antenna is configured to transmit the single DCI and transmit or receive the data.

Aspect 38 is a non-transitory computer-readable medium including instructions that, when executed by an apparatus, cause the apparatus to perform a method in accordance with any of aspects 20-34.

What is claimed is:

1. An apparatus for wireless communication at a user equipment (UE), comprising:

memory; and at least one processor coupled to the memory and, based at least in part on information stored in the memory, the at least one processor is configured to:

receive a single downlink control information (DCI) scheduling resources for a plurality of physical shared channel transmissions and indicating one or more parameters of each of the plurality of physical shared channel transmissions based on at least one of an entry in a table, a pattern, a linkage parameter, or a rule, wherein the one or more parameters includes at least one of a modulation and coding scheme (MCS), a frequency domain resource allocation (FDRA), a transmission configuration indication (TCI) state, or spatial relation information that is indicated separately for each of the plurality of physical shared channel transmissions; and transmit or receive data over at least one of a plurality of physical shared channels based upon the one or more parameters indicated in the single DCI.

2. The apparatus of claim 1, wherein the plurality of physical shared channel transmissions includes at least one of one or more physical downlink shared channel (PDSCH) transmissions or one or more physical uplink shared channel (PUSCH) transmissions.

3. The apparatus of claim 1, wherein the one or more parameters that are indicated separately for each of the plurality of physical shared channel transmissions further include a time domain resource allocation (TDRA).

4. The apparatus of claim 1, wherein the data is transmitted or received over a first physical shared channel and a second physical shared channel in the plurality of physical shared channels, wherein the first physical shared channel has first one or more values for the one or more parameters based upon the single DCI, wherein the second physical shared channel has second one or more values for the one or more parameters based upon the single DCI, wherein the first one or more values differ at least in part from the second one or more values.

5. The apparatus of claim 1, wherein the data is associated with extended reality (XR) traffic.

6. The apparatus of claim 1, wherein the at least one processor is further configured to:

receive a radio resource control (RRC) configuration that configures the table for the UE, wherein the table includes different entries with one or more associated values for the one or more parameters, wherein at least one value differs between each entry in the different entries.

7. The apparatus of claim 6, wherein the single DCI includes an identifier for the entry in the table, wherein the at least one processor is further configured to:

select values for the one or more parameters for each of the plurality of physical shared channel transmissions from the table based upon the identifier for the entry, wherein transmit or receive the data over the at least one of the plurality of physical shared channels is based upon the values for the one or more parameters.

8. The apparatus of claim 6, wherein the table includes a first entry associated with a first number of physical shared channels and a second entry associated with a second number of physical shared channels, wherein the first number is different than the second number.

9. The apparatus of claim 6, wherein the one or more associated values for the one or more parameters comprise delta values, wherein the single DCI includes an identifier for the entry in the table and one or more nominal values, wherein the at least one processor is further configured to:

select values for the one or more parameters from the table based upon the identifier for the entry, the one or more nominal values included in the single DCI, and one or more delta values for the entry, wherein transmit or receive the data over the at least one of the plurality of physical shared channels is based upon the values.

10. The apparatus of claim 6, wherein the one or more associated values for the one or more parameters comprise nominal values, wherein the single DCI includes an identifier for the entry in the table and one or more delta values, wherein the at least one processor is further configured to:

select values for the one or more parameters from the table based upon the identifier for the entry in the table, the one or more delta values included in the single DCI, and one or more nominal values for the entry, wherein transmit or receive the data over the at least one of the plurality of physical shared channels is based upon the values.

11. The apparatus of claim 1, wherein the data includes first one or more packets associated with a first stream and second one or more packets associated with a second stream, wherein the pattern indicates that the first stream is transmitted or received via first one or more physical shared channels having first one or more values for the one or more parameters, wherein the pattern indicates that the second stream is transmitted or received via second one or more physical shared channels having second one or more values for the one or more parameters.

12. The apparatus of claim 1, wherein the at least one processor is further configured to:

receive, via radio resource control (RRC) or a second DCI, a definition of a linkage that includes a first value for a first parameter of a physical shared channel, wherein the definition of the linkage parameter indicates that if the first value is applied for the first parameter of the physical shared channel for transmit or receive the data, a second value for a second parameter of the physical shared channel is also applied for transmit or receive the data.

13. The apparatus of claim 12, wherein the single DCI further indicates that the definition of the linkage parameter is overridden and that a third value for the second parameter of the physical shared channel is applied for transmit or receive the data.

14. The apparatus of claim 1, wherein the at least one processor is further configured to:

receive, via radio resource control (RRC) or a second DCI, a configuration for the rule, wherein the data includes first one or more packets associated with a first stream and second one or more packets associated with a second stream, wherein at least some of the first one or more packets and the second one or more packets collide, wherein the rule indicates that the first one or more packets are transmitted or received via first one or more physical shared channels having first one or more values for the one or more parameters, the second one or more packets are transmitted or received via second one or more physical shared channels having second one or more values for the one or more parameters, and colliding packets are transmitted or received via third one or more physical shared channels having third one or more values for the one or more parameters.

15. The apparatus of claim 14, wherein the single DCI further indicates that the rule is to be overridden and that fourth one or more values are applied in place of at least one of the first one or more values, the second one or more values, or the third one or more values for transmit or receive the data.

16. The apparatus of claim 1, further comprising at least one of a transceiver or an antenna coupled to the at least one processor, wherein at least one of the transceiver or the antenna is configured to receive the single DCI and transmit or receive the data.

17. The apparatus of claim 1, wherein the one or more parameters indicated in the single DCI includes the MCS that is indicated separately for each of the plurality of physical shared channel transmissions.

18. The apparatus of claim 1, wherein the one or more parameters indicated in the single DCI includes the FDRA that is indicated separately for each of the plurality of physical shared channel transmissions.

19. The apparatus of claim 1, wherein the one or more parameters indicated in the single DCI includes the TCI state that is indicated separately for each of the plurality of physical shared channel transmissions.

20. The apparatus of claim 1, wherein the one or more parameters indicated in the single DCI includes the spatial relation information that is indicated separately for each of the plurality of physical shared channel transmissions.

21. A method of wireless communication at a user equipment (UE), comprising:

receiving a single downlink control information (DCI) scheduling resources for a plurality of physical shared channel transmissions and indicating one or more parameters of each of the plurality of physical shared channel transmissions based on at least one of an entry in a table, a pattern, a linkage parameter, or a rule, wherein the one or more parameters includes at least one of a modulation and coding scheme (MCS), a frequency domain resource allocation (FDRA), a transmission configuration indication (TCI) state, or spatial relation information that is indicated separately for each of the plurality of physical shared channel transmissions; and transmitting or receiving data over at least one of a plurality of physical shared channels based upon the one or more parameters indicated in the single DCI.

22. An apparatus for wireless communication at a network node, comprising:

memory; and at least one processor coupled to the memory and, based at least in part on information stored in the memory, the at least one processor is configured to:

transmit a single downlink control information (DCI) scheduling resources for a plurality of physical shared channel transmissions and indicating one or more parameters of each of the plurality of physical shared channel transmissions based on at least one of an entry in a table, a pattern, a linkage parameter, or a rule, wherein the one or more parameters includes at least one of a modulation and coding scheme (MCS), a frequency domain resource allocation (FDRA), a transmission configuration indication (TCI) state, or spatial relation information that is indicated separately for each of the plurality of physical shared channel transmissions; and transmit or receive data over at least one of a plurality of physical shared channels based upon the one or more parameters indicated in the single DCI.

23. The apparatus of claim 22, wherein the plurality of physical shared channel transmissions includes at least one of one or more physical downlink shared channel (PDSCH) transmissions or one or more physical uplink shared channel (PUSCH) transmissions.

24. The apparatus of claim 22, wherein the one or more parameters are indicated separately for each of the plurality of physical shared channel transmissions further include a time domain resource allocation (TDRA).

25. The apparatus of claim 22, wherein the data is transmitted or received over a first physical shared channel and a second physical shared channel in the plurality of physical shared channels, wherein the first physical shared channel has first one or more values for the one or more parameters based upon the single DCI, wherein the second physical shared channel has second one or more values for the one or more parameters based upon the single DCI, wherein the first one or more values differ at least in part from the second one or more values.

26. The apparatus of claim 22, wherein the data is associated with extended reality (XR) traffic.

27. The apparatus of claim 22, wherein the at least one processor is further configured to:

transmit a radio resource control (RRC) configuration that configures the table, wherein the table includes different entries with one or more associated values for the one or more parameters, wherein at least one value differs between each entry in the different entries.

28. The apparatus of claim 27, wherein the single DCI includes an identifier for the entry in the table, wherein transmit or receive the data over the at least one of the plurality of physical shared channels is based upon the identifier for the entry in the table and values for the one or more parameters in the table.

29. The apparatus of claim 27, wherein the table includes a first entry associated with a first number of physical shared channels and a second entry associated with a second number of physical shared channels, wherein the first number is different than the second number.

30. The apparatus of claim 27, wherein the one or more associated values for the one or more parameters comprise delta values, wherein the single DCI includes an identifier for the entry in the table and one or more nominal values, wherein transmit or receive the data over the at least one of the plurality of physical shared channels is based upon the identifier for the entry in the table, the one or more nominal values, and the delta values in the table.

31. The apparatus of claim 27, wherein the one or more associated values for the one or more parameters comprise nominal values, wherein the single DCI includes an identifier for the entry in the table and one or more delta values, wherein transmit or receive the data over the at least one of the plurality of physical shared channels is based upon the identifier for the entry in the table, the one or more delta values, and the nominal values in the table.

32. The apparatus of claim 22, wherein the data includes first one or more packets associated with a first stream and second one or more packets associated with a second stream, wherein the pattern indicates that the first stream is transmitted or received via first one or more physical shared channels having first one or more values for the one or more parameters, wherein the pattern indicates that the second stream is transmitted or received via second one or more physical shared channels having second one or more values for the one or more parameters.

33. The apparatus of claim 22, further comprising at least one of a transceiver or an antenna coupled to the at least one processor, wherein at least one of the transceiver or the antenna is configured to transmit the single DCI and transmit or receive the data.

34. A method of wireless communication at a network node, comprising:

transmitting a single downlink control information (DCI) scheduling resources for a plurality of physical shared channel transmissions and indicating one or more parameters of each of the plurality of physical shared channel transmissions based on at least one of an entry in a table, a pattern, a linkage parameter, or a rule, wherein the one or more parameters includes at least one of a modulation and coding scheme (MCS), a frequency domain resource allocation (FDRA), a transmission configuration indication (TCI) state, or spatial relation information that is indicated separately for each of the plurality of physical shared channel transmissions; and transmitting or receiving data over at least one of a plurality of physical shared channels based upon the one or more parameters indicated in the single DCI.

* * * * *